US011560160B2

(12) United States Patent
Sakano et al.

(10) Patent No.: US 11,560,160 B2
(45) Date of Patent: Jan. 24, 2023

(54) INFORMATION PROCESSING APPARATUS

(71) Applicant: Faurecia Clarion Electronics Co., Ltd., Saitama (JP)

(72) Inventors: Morihiko Sakano, Tokyo (JP); Shinya Tagawa, Saitama (JP); Masahiro Kiyohara, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 163 days.

(21) Appl. No.: 17/059,129

(22) PCT Filed: Mar. 5, 2019

(86) PCT No.: PCT/JP2019/008631
§ 371 (c)(1),
(2) Date: Nov. 25, 2020

(87) PCT Pub. No.: WO2019/230098
PCT Pub. Date: Dec. 5, 2019

(65) Prior Publication Data
US 2021/0206391 A1 Jul. 8, 2021

(30) Foreign Application Priority Data
May 30, 2018 (JP) .............................. JP2018-104102

(51) Int. Cl.
*B60W 60/00* (2020.01)
*G01C 21/00* (2006.01)
(Continued)

(52) U.S. Cl.
CPC ..... *B60W 60/0027* (2020.02); *G01C 21/3807* (2020.08); *G06V 20/586* (2022.01);
(Continued)

(58) Field of Classification Search
CPC ..... B60W 60/0027; B60W 2554/4041; B60W 2554/4042; B60W 2554/4044;
(Continued)

(56) References Cited

U.S. PATENT DOCUMENTS

2014/0233010 A1* 8/2014 Baldwin ............... G01S 7/4808
356/4.01
2015/0331111 A1* 11/2015 Newman ............... G01S 7/4808
356/4.01
(Continued)

FOREIGN PATENT DOCUMENTS

JP 2012-141662 A 7/2012
JP 2015-77862 A 4/2015
(Continued)

OTHER PUBLICATIONS

International Search Report with English translation, corresponding to PCT/JP2019/008631, and Written Opinion, dated May 28, 2019, 10 pages.

(Continued)

*Primary Examiner* — Elaine Gort
*Assistant Examiner* — Matthias S Weisfeld
(74) *Attorney, Agent, or Firm* — Reising Ethington, P.C.

(57) ABSTRACT

An information processing apparatus includes: a point group data acquisition unit configured to acquire, based on information from a sensor configured to detect an object existing in surroundings of a vehicle, point group data related to a plurality of points representing the object; a movement amount estimation unit configured to estimate a movement amount of the vehicle; a storage unit configured to store, as a point group map recorded in association with position information including a latitude and a longitude, relative positions of the plurality of points relative to a first reference position that is a place on a travel path of the vehicle; and (Continued)

a position estimation unit configured to estimate a position of the vehicle based on the point group map, the point group data, and the movement amount.

9 Claims, 14 Drawing Sheets

(51) Int. Cl.
  *G06V 20/58* (2022.01)
  *G06V 20/56* (2022.01)
(52) U.S. Cl.
  CPC ....... *G06V 20/588* (2022.01); *B60W 2520/06* (2013.01); *B60W 2520/10* (2013.01); *B60W 2520/12* (2013.01); *B60W 2554/4041* (2020.02); *B60W 2554/4042* (2020.02); *B60W 2554/4043* (2020.02); *B60W 2554/4044* (2020.02)
(58) Field of Classification Search
  CPC ..... B60W 2554/4043; B60W 2520/06; B60W 2520/10; B60W 2520/12; B60W 60/00; G01C 21/3807; G06V 20/586; G06V 20/588
  USPC .......................................................... 701/25
  See application file for complete search history.

(56) References Cited

U.S. PATENT DOCUMENTS

| | | | |
|---|---|---|---|
| 2018/0172455 A1* | 6/2018 | Yamaguchi | G01C 21/30 |
| 2019/0066514 A1* | 2/2019 | Yamamura | B62D 15/0285 |
| 2019/0272434 A1* | 9/2019 | Dorum | G06V 10/758 |
| 2019/0291721 A1 | 9/2019 | Sakano et al. | |

FOREIGN PATENT DOCUMENTS

| | | |
|---|---|---|
| JP | 2018-4343 A | 1/2018 |
| WO | WO 2018/003406 A1 | 1/2018 |
| WO | WO 2018/020589 A1 | 2/2018 |
| WO | WO-2018020589 A1 * | 2/2018 ........... G01C 21/165 |

OTHER PUBLICATIONS

Extended European Search Report dated Feb. 15, 2022 for corresponding European Application No. 19812343.2 (9 pages).

* cited by examiner

| CAR PARK1 | NAME | | x COOR-DINATE | y COOR-DINATE | LATITUDE· LONGITUDE | TYPE |
|---|---|---|---|---|---|---|
| | PARKING AREA | APEX1 | | | | |
| | | APEX2 | | | | |
| | | APEX3 | | | | |
| | | APEX4 | | | | |
| | LANDMARK | 1 | | | | |
| | | 2 | | | | |
| | | 3 | | | | |
| | | . | | | | |
| | | . | | | | |
| | PATH | 1 | | | | |
| | | 2 | | | | |
| | | 3 | | | | |
| | | . | | | | |
| | | . | | | | |
| CAR PARK2 | NAME | | x COOR-DINATE | y COOR-DINATE | LATITUDE· LONGITUDE | TYPE |
| | PARKING AREA | APEX1 | | | | |
| | | APEX2 | | | | |
| | | APEX3 | | | | |
| | | APEX4 | | | | |
| | LANDMARK | 1 | | | | |
| | | 2 | | | | |
| | | 3 | | | | |
| | | . | | | | |
| | | . | | | | |
| | PATH | 1 | | | | |
| | | 2 | | | | |
| | | 3 | | | | |
| | | . | | | | |
| | | . | | | | |

FIG. 10
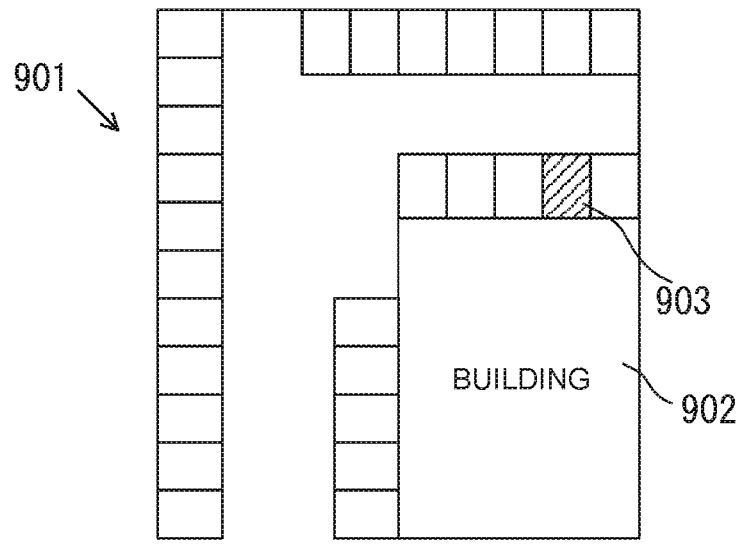
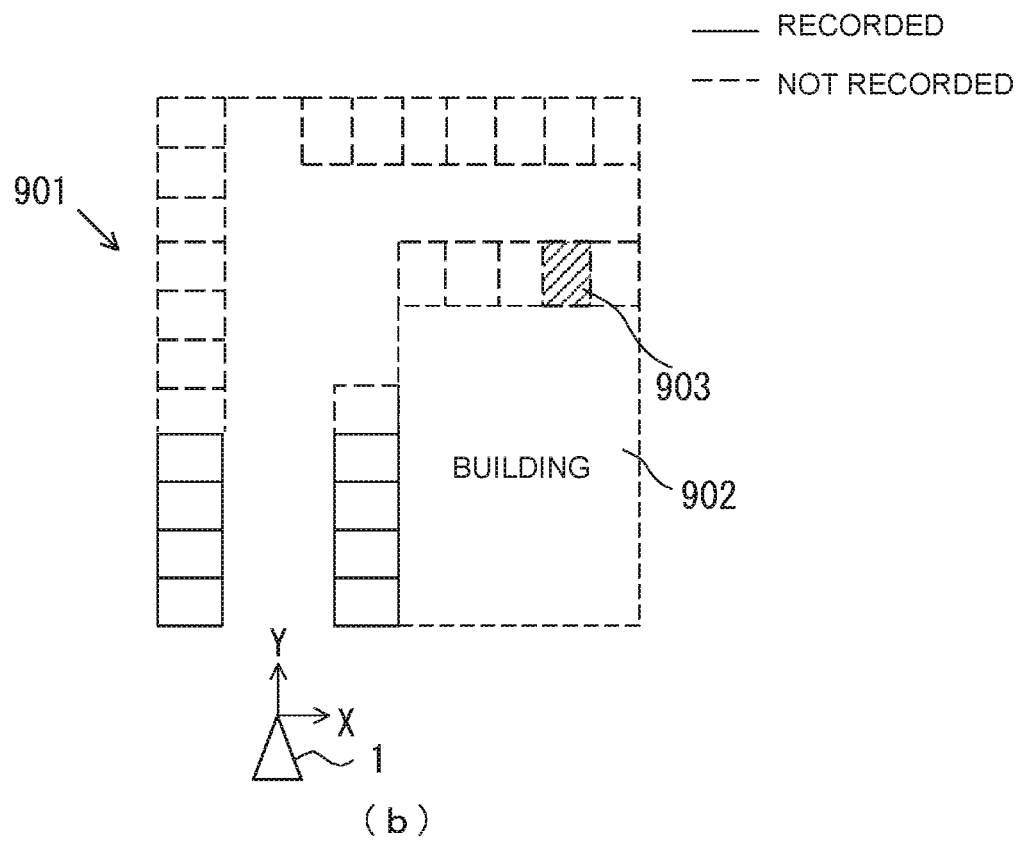

FIG. 11
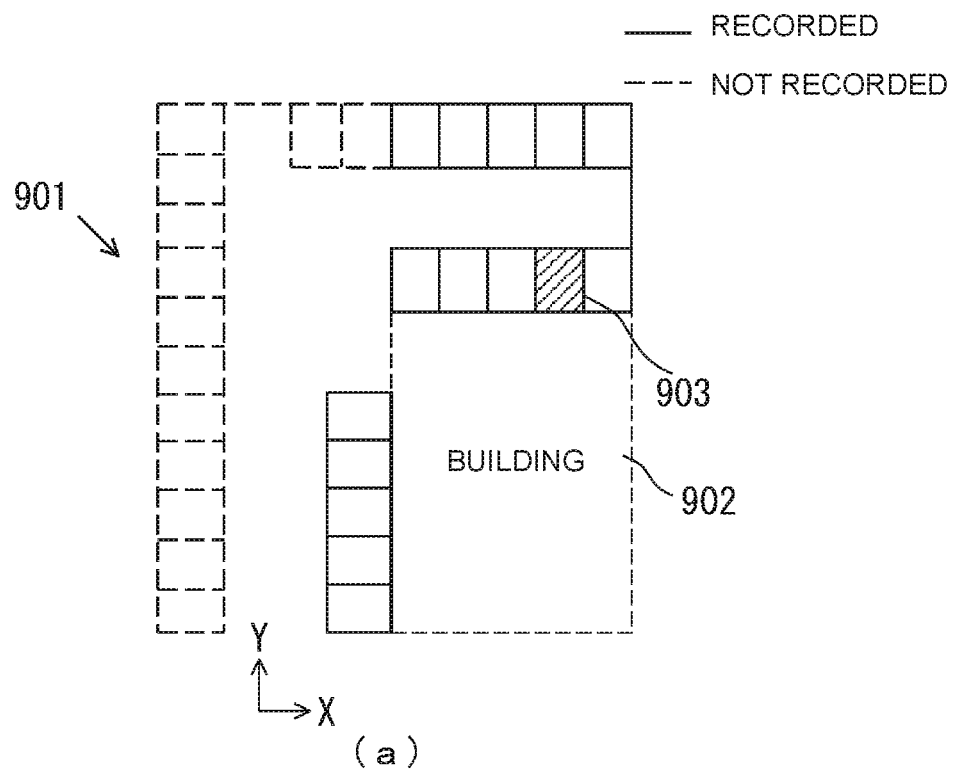
(a)
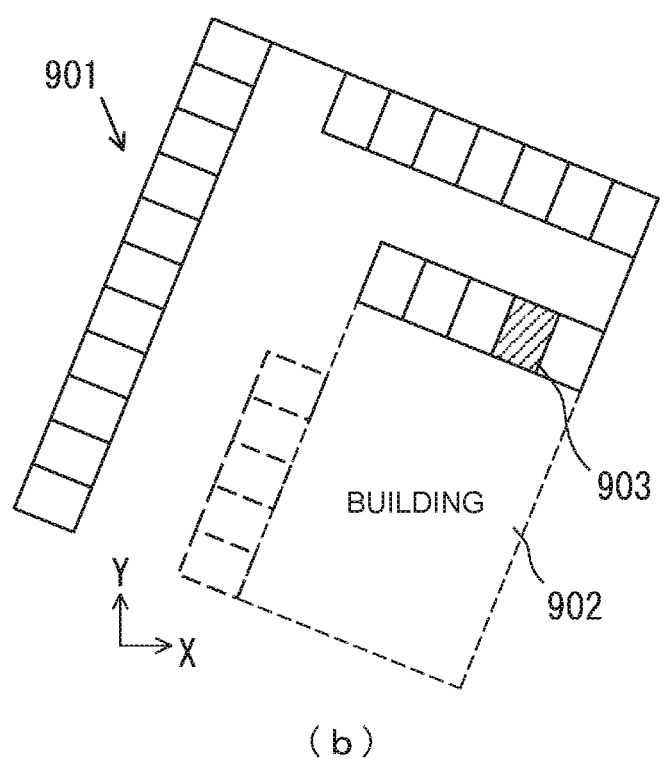
(b)

FIG. 12
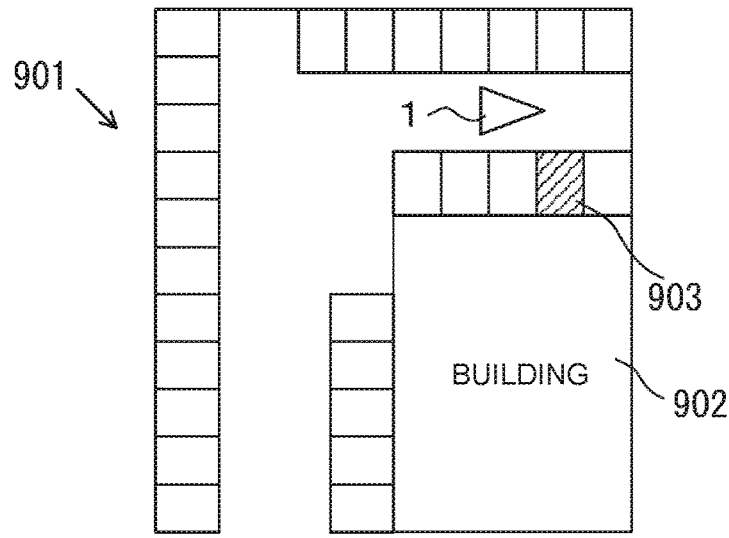
(a)
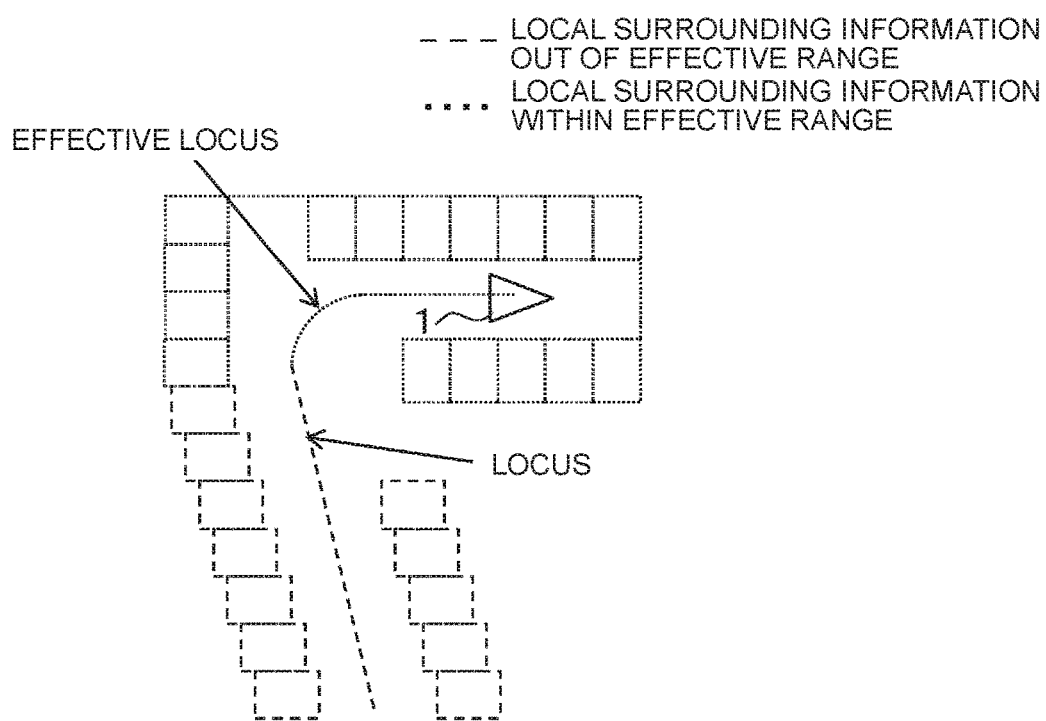
(b)

FIG. 13
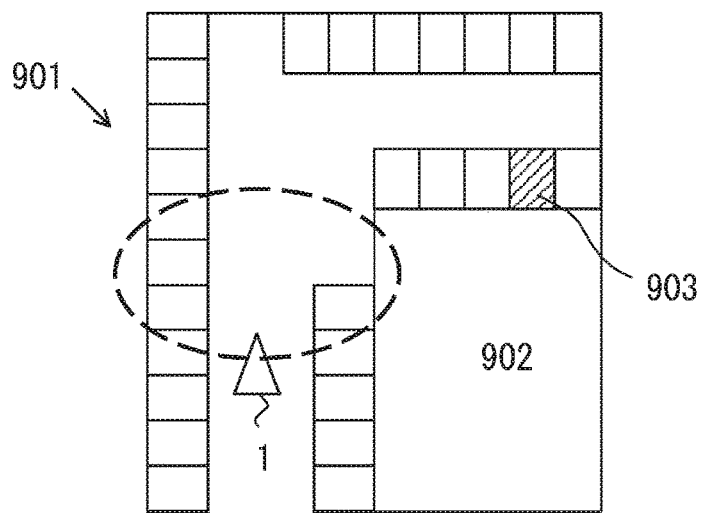
(a)
--- LOCAL SURROUNDING INFORMATION
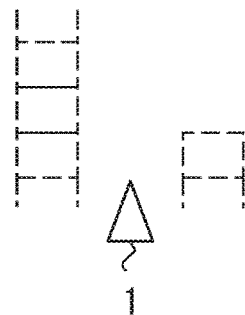
(b)
—— CAR PARK POINT GROUP
--- LOCAL SURROUNDING INFORMATION
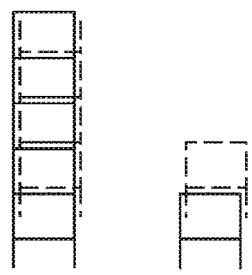
(c)

INFORMATION PROCESSING APPARATUS

CROSS-REFERENCE TO RELATED APPLICATION(S)

This application is a U.S. National Phase Patent Application and claims priority to and the benefit of International Application Number PCT/JP2019/008631, filed on Mar. 5, 2019, which claims priority of Japanese Patent Application Number 2018-104102, filed on May 30, 2018, the entire contents of all of which are incorporated herein by reference.

TECHNICAL FIELD

The present invention relates to an information processing apparatus.

BACKGROUND ART

Recently, automated driving technologies of sensing surroundings of an automobile through external sensors such as a camera and various radars and causing the vehicle to autonomously travel based on a result of the sensing without an operation by a driver have been developed. Automated parking is a form of such automated driving. In the automated parking, automated driving limited to a car park is performed to automatically park the vehicle at a desired parking partition.

To achieve the automated parking, the position of the vehicle in a car park needs to be accurately estimated. For this estimation, a technology of Patent Literature 1 below is known. Patent Literature 1 discloses a robot self-position estimation method that executes at least one of first processing of acquiring map data of a space in which a robot moves, calculating, by simulation, a self-position estimation easiness parameter indicating easiness of estimation of the self-position of the robot for each area in the map data, and presenting information related to the self-position estimation easiness parameter to a user before autonomous travel of the robot, and second processing of causing the robot to estimate the self-position based on the self-position estimation easiness parameter.

CITATION LIST

Patent Literature

[Patent Literature 1] Japanese Patent Laid-Open No. 2012-141662

SUMMARY OF INVENTION

Technical Problem

The technology of Patent Literature 1 has a problem that it is difficult to accurately estimate the self-position when the amount of acquired map data is insufficient.

Solution to Problem

An information processing apparatus according to the present invention is mounted on a vehicle and includes: a point group data acquisition unit configured to acquire, based on information from a sensor configured to detect an object existing in surroundings of the vehicle, point group data related to a plurality of points representing the object; a movement amount estimation unit configured to estimate a movement amount of the vehicle; a storage unit configured to store, as a point group map recorded in association with position information including a latitude and a longitude, relative positions of the plurality of points relative to a first reference position that is a place on a travel path of the vehicle; and a position estimation unit configured to estimate a position of the vehicle based on the point group map, the point group data, and the movement amount, and the position estimation unit generates, based on the point group data and the movement amount, local surrounding information that sets a second reference position to be a place on the travel path of the vehicle, which is different from the place of the first reference position, calculates, based on the point group map and the local surrounding information, a relational expression that expresses a relation between the first reference position and the second reference position, and estimates the position of the vehicle by using the relational expression.

Advantageous Effects of Invention

According to the present invention, it is possible to accurately estimate the position of a vehicle.

BRIEF DESCRIPTION OF DRAWINGS

FIG. 2 is a diagram illustrating an exemplary point group map stored in a storage unit.

FIG. 10 (*a*) is a plan view illustrating an exemplary car park, and FIG. 10 (*b*) is a diagram visualizing each point of a landmark represented by point group data.

FIG. 11 (*a*) is a diagram illustrating car park data, and FIG. 11 (*b*) is a diagram illustrating point group data.

FIG. 12 (*a*) is a diagram illustrating the current position of a vehicle when the vehicle approaches a parking area in the car park, and FIG. 12 (*b*) is a diagram illustrating exemplary data obtained by transforming local surrounding information acquired in the position estimation mode from a local coordinate system into a car-park coordinate system.

FIG. 13 (*a*) is a diagram illustrating the current position of the vehicle when the vehicle travels toward the parking area in the car park, FIG. 13 (*b*) is a diagram illustrating exemplary data obtained by transforming, from the local coordinate system to the car-park coordinate system, the coordinate value of each point in local surrounding information obtained by landmark positioning of a parking frame line in a front-side area of the vehicle, and FIG. 13 (*c*) is a diagram illustrating exemplary comparison between the point group map and the local surrounding information when a result of estimation of the position of a vehicle 1 in the car-park coordinate system includes an error.

DESCRIPTION OF EMBODIMENTS

First Embodiment

An information processing apparatus according to a first embodiment of the present invention will be described below with reference to the accompanying drawings.

Figure 1:
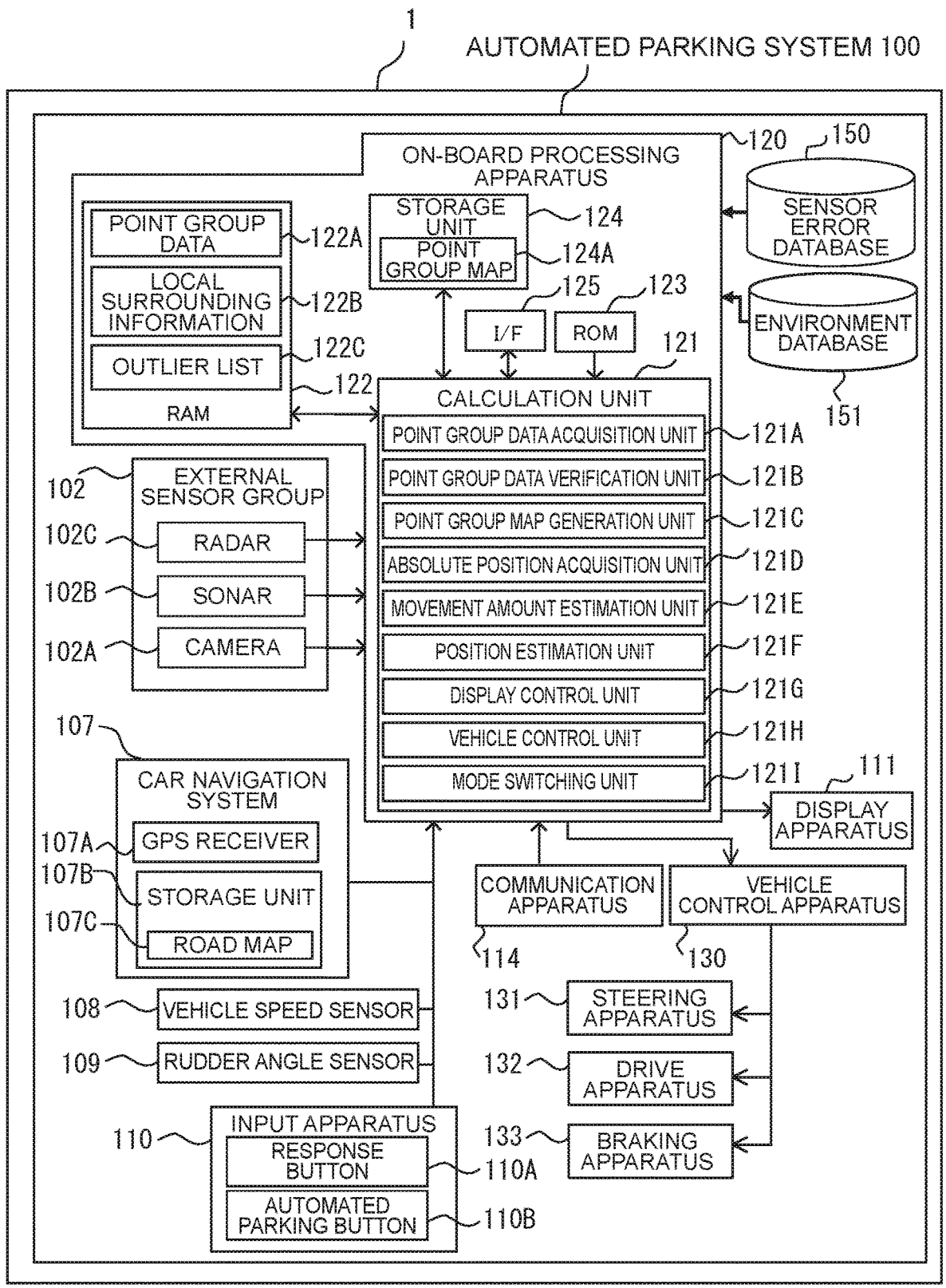
FIG. 1 is a configuration diagram of an automated parking system including an information processing apparatus according to an embodiment of the present invention.

FIG. 1 is a configuration diagram of an automated parking system 100 including the information processing apparatus according to the embodiment of the present invention. The automated parking system 100 is mounted on a vehicle 1. The automated parking system 100 includes an external sensor group 102, a car navigation system 107, a vehicle speed sensor 108, a rudder angle sensor 109, an input apparatus 110, a display apparatus 111, a communication apparatus 114, an on-board processing apparatus 120, a vehicle control apparatus 130, a steering apparatus 131, a drive apparatus 132, a braking apparatus 133, a sensor error database 150, and an environment database 151. The external sensor group 102, the car navigation system 107, the vehicle speed sensor 108, the rudder angle sensor 109, the input apparatus 110, the display apparatus 111, the communication apparatus 114, the vehicle control apparatus 130, the sensor error database 150, and the environment database 151 are each coupled with the on-board processing apparatus 120 through a signal line to communicate various signals and various kinds of data with the on-board processing apparatus 120.

The external sensor group 102 detects an object existing in surroundings of the vehicle 1 and outputs detection information thereof to the on-board processing apparatus 120. The external sensor group 102 includes a camera 102A configured to perform image capturing of surroundings of the vehicle 1, a sonar 102B configured to observe an object in surroundings of the vehicle 1 by using ultrasonic wave, and a radar 102C configured to observe an object in surroundings of the vehicle 1 by using radio wave or infrared. Not all sensors necessarily need to be included in the external sensor group 102, and another sensor may be included in the external sensor group 102. Any optional sensor capable of detecting an object existing in surroundings of the vehicle 1 may be included in the external sensor group 102.

The car navigation system 107 includes a GPS receiver 107A and a storage unit 107B. The GPS receiver 107A receives signals from a plurality of satellites included in a satellite navigation system. The storage unit 107B is a nonvolatile storage apparatus and stores a road map 107C. The road map 107C includes information related to a road coupling structure, and latitude-longitude information corresponding to a road position.

The car navigation system 107 calculates, based on information included in signals received by the GPS receiver 107A, a latitude and a longitude indicating the position of the car navigation system 107 on the Earth, in other words, the position of the vehicle 1. In this case, a road corresponding to the position of the vehicle 1 is specified by referring to the road map 107C as necessary, and the position of the vehicle 1 is corrected in accordance with the road. The accuracy of the latitude and longitude calculated by the car navigation system 107 does not necessarily need to be high but may include, for example, an error of several m to 10 m approximately. The car navigation system 107 outputs information of the calculated latitude and longitude to the on-board processing apparatus 120.

The vehicle speed sensor 108 and the rudder angle sensor 109 measures the vehicle speed and rudder angle, respectively, of the vehicle 1 and outputs the measured vehicle speed and rudder angle to the on-board processing apparatus 120. The on-board processing apparatus 120 can calculate the movement amount and movement direction of the vehicle 1 by a well-known dead reckoning technology using the outputs from the vehicle speed sensor 108 and the rudder angle sensor 109.

The input apparatus 110 receives operation command inputting on the on-board processing apparatus 120 by a user and outputs, to the on-board processing apparatus 120, an operation command signal in accordance with the contents of the inputting. The input apparatus 110 includes, for example, a response button 110A and an automated parking button 110B. Details of these buttons will be described later. The display apparatus 111 is, for example, a liquid crystal display and displays an image output from the on-board processing apparatus 120. The input apparatus 110 and the display apparatus 111 may be integrated as, for example, a touch-panel display configured to support a touch operation. In this case, it can be determined that the response button 110A or the automated parking button 110B is pressed when the user touches a predetermined area on the display in accordance with an image displayed on the display.

The communication apparatus 114 is used to wirelessly transmit and receive information between an instrument outside the vehicle 1 and the on-board processing apparatus 120. For example, when the user is outside the vehicle 1, the on-board processing apparatus 120 uses the communication apparatus 114 to transmit and receive information through communication with a portable terminal being brought with the user. The target of communication by the communication apparatus 114 is not limited to the portable terminal of the user, but the communication apparatus 114 may perform communication with an optional instrument capable of performing wireless communication.

The vehicle control apparatus 130 controls the steering apparatus 131, the drive apparatus 132, and the braking apparatus 133 based on a vehicle control command from the on-board processing apparatus 120. The steering apparatus 131 operates steering of the vehicle 1. The drive apparatus 132 provides drive power to the vehicle 1. The drive apparatus 132 increases drive power of the vehicle 1 by, for example, increasing a target rotation speed of an engine included in the vehicle 1. The braking apparatus 133 provides braking force to the vehicle 1. In the automated parking system 100, the vehicle control apparatus 130 performs these kinds of control in accordance with the vehicle control command from the on-board processing apparatus 120, thereby automatically moving the vehicle 1 without a driving operation by the user to park the vehicle 1 at an optional parking position.

The on-board processing apparatus 120 includes a calculation unit 121, a RAM 122, a ROM 123, a storage unit 124, and an interface 125. The calculation unit 121 is, for example, a CPU and performs various kinds of arithmetic processing by executing computer programs. Another arithmetic processing apparatus such as a FPGA may be used to achieve all or some functions of the calculation unit 121. The RAM 122 is a readable and writable storage area and operates as a main storage apparatus of the on-board processing apparatus 120. The ROM 123 is a read-only storage area and stores a computer program executed by the calculation unit 121. The computer program is loaded onto the RAM 122 and executed by the calculation unit 121. The calculation unit 121 reads and executes the computer program loaded onto the RAM 122 to operate as functional blocks of a point group data acquisition unit 121A, a point group data verification unit 121B, a point group map generation unit 121C, an absolute position acquisition unit 121D, a movement amount estimation unit 121E, a position estimation unit 121F, a display control unit 121G, a vehicle control unit 121H, and a mode switching unit 121I. The pieces of information of a point group data 122A, a local surrounding information 122B, and an outlier list 122C are generated by the computer program executed by the calculation unit 121 and are temporarily stored in the RAM 122. Details of these functional blocks and pieces of information will be described later.

The storage unit 124 is a nonvolatile storage apparatus and operates as an auxiliary storage apparatus of the on-board processing apparatus 120. The storage unit 124 stores a point group map 124A. The point group map 124A is information in which coordinate values of a plurality of points representing an object existing in surroundings of the vehicle 1 at a place where the vehicle 1 traveled in the past are recorded in association with position information of the place. In the on-board processing apparatus 120 of the present embodiment, which is used in the automated parking system 100, car park data related to car parks in various locations is stored as the point group map 124A in the storage unit 124. The car park data is a set of a latitude and a longitude indicating position information of each car park, a coordinate value indicating a parking area in the car park, and coordinate values of a plurality of points representing a landmark existing in the car park. Specific configuration and landmarks of the car park data in the point group map 124A will be described later.

The interface 125 performs interface processing of information input and output between the on-board processing apparatus 120 and another instrument included in the automated parking system 100.

The sensor error database 150 stores error information of the vehicle speed sensor 108 and the rudder angle sensor 109. The environment database 151 stores information on an allowable accuracy of control of the vehicle 1, which is performed by the vehicle control apparatus 130. Values measured or calculated in advance are used as these pieces of information. The on-board processing apparatus 120 can perform verification related to formability of the point group map 124A by using information in these databases. This point will be described later.

(Landmark Positioning)

Subsequently, a landmark will be described below. The landmark is an object existing in surroundings of the vehicle 1 and having a characteristic identifiable by the external sensor group 102 and is, for example, a parking frame line as a kind of road surface paint or a wall of a building as an obstacle that would interfere with traveling of the vehicle 1. In the present embodiment, moving objects such as a vehicle and a person are not included in landmarks. The on-board processing apparatus 120 detects, based on the detection information input from the external sensor group 102, a landmark existing in surroundings of the vehicle 1, in other words, a point having a characteristic identifiable by the external sensor group 102. Hereinafter, the landmark detection performed based on the detection information input from the external sensor group 102 is referred to as "landmark positioning".

The camera 102A outputs an image (hereinafter referred to as a captured image) obtained through image capturing of surroundings of the vehicle 1 to the on-board processing apparatus 120. The on-board processing apparatus 120 performs landmark positioning by using the captured image from the camera 102A. Internal parameters such as the focal length and image sensor size of the camera 102A, and external parameters such as the position and posture of attachment of the camera 102A to the vehicle 1 are known and stored in the ROM 123 in advance. The on-board processing apparatus 120 can perform landmark positioning by calculating the positional relation between an object and the camera 102A by using the internal and external parameters stored in the ROM 123.

The sonar 102B and the radar 102C radiate sound waves and radio waves, respectively, having specific wavelengths and measure durations until returning reflected waves having reflected on an object in surroundings of the vehicle 1 are received, thereby observing the position of the object. Then, the obtained position of the object is output to the on-board processing apparatus 120. The on-board processing apparatus 120 can perform landmark positioning by acquiring the object position input from the sonar 102B and the radar 102C.

When landmark positioning is performed by using the camera 102A, the on-board processing apparatus 120 may detect a road surface paint such as a parking frame by operating an image recognition program for a captured image of the camera 102A as described below. In the parking frame detection, first, an edge is extracted from an input image through a line extraction filter or the like. Subsequently, for example, a pair of an edge rise that is a change from white to black and an edge fall that is a change from black to white is extracted. Then, when the interval between the pair is substantially equal to a first predetermined distance determined in advance, in other words, the thickness of a white line included in a parking frame, the pair is set as a parking frame candidate. A plurality of parking frame candidates are detected through the same processing, and when the interval between parking frame candidates is substantially equal to a second predetermined distance determined in advance, in other words, the interval between white lines of a parking frame, the parking frame candidates are detected as a parking frame. A road surface paint other than a parking frame is detected by an image recognition program that executes processing as follows. First, edges are extracted from an input captured image through the line extraction filter or the like. Edges can be detected by searching for pixels that have an edge intensity larger than a certain value determined in advance and for which the interval between the edges is equal to a distance determined in advance and corresponding to the width of a white line.

When landmark positioning is performed by using the camera 102A, the on-board processing apparatus 120 preferably detects any other vehicle or person by, for example, known template matching and excludes the detected vehicle or person from a measurement result. In addition, a moving object detected as described below may be excluded from a measurement result. Specifically, the on-board processing apparatus 120 calculates the positional relation between an object in a captured image and the camera 102A by using internal and external parameters. Subsequently, the on-board processing apparatus 120 calculates the relative speeds of the vehicle 1 and the object by tracing the object in captured images continuously acquired by the camera 102A. Lastly, the on-board processing apparatus 120 calculates the speed of the vehicle 1 by using outputs from the vehicle speed sensor 108 and the rudder angle sensor 109, and when the calculated speed is not equal to the speed relative to the object, the on-board processing apparatus 120 determines that the object is a moving object, and excludes information related to the moving object from a measurement result. Similarly, in landmark positioning using the sonar 102B or the radar 102C, a moving object may be determined and excluded from a measurement result.

(Point Group Map 124A)

Subsequently, details of the point group map 124A stored in the storage unit 124 will be described below. FIG. 2 is a diagram illustrating an exemplary point group map 124A stored in the storage unit 124. FIG. 2 illustrates an example in which two pieces of car park data are stored as the point group map 124A.

Each piece of car park data in the point group map 124A includes the coordinate value of each apex of a parking area, the coordinate value of each point representing a landmark on a two-dimensional plane, and the coordinate value of each point representing a traveled path at storage. The coordinate value of each point is recorded in combination with corresponding latitude, longitude, and type. The type records, for example, the kind of a landmark performed by the point. The car park data in the point group map 124A is not limited to a coordinate value on a two-dimensional plane but may include the coordinate value of three-dimensional space coordinates including a z coordinate as the altitude.

Each coordinate value of car park data in the point group map 124A indicates a coordinate value in a coordinate system unique to the car park data. Hereinafter, a coordinate system indicating each coordinate value of car park data is referred to as a "car-park coordinate system". A latitude and a longitude recorded in association with each coordinate value indicate an absolute position on the Earth. Thus, hereinafter, a coordinate system indicating a latitude and a longitude is referred to as an "absolute coordinate system".

The car-park coordinate system is set with reference to a predetermined place in a car park. For example, in the point group map 124A, the origin of the car-park coordinate system is set to be the position of the vehicle 1 when recording of the car park data is started, the Y axis of the car-park coordinate system is set to be the traveling direction of the vehicle 1, and the X axis of the car-park coordinate system is set to be the right direction of the vehicle 1. Specifically, in the point group map 124A, a place on a travel path through the vehicle 1 traveled in the past is set as a reference position (first reference position), and the relative position of each point with respect to the first reference position is recorded in association with position information including a latitude and a longitude expressed in the absolute coordinate system.

For example, when a parking area has a rectangular shape, the coordinate values of the parking area are recorded as the coordinate values of four apexes of the rectangular area. However, the parking area is not limited to a rectangular shape but may have a polygonal shape or an elliptical shape other than a rectangular shape. In the example illustrated in FIG. 2, a set of coordinate values of a parking area is recorded in each of the two pieces of car park data, but a plurality of sets of coordinate values of a parking area may be recorded in each piece of car park data. In this manner, in a car park in which a plurality of parking areas exist, the position of each parking area can be expressed in the parking data.

(Outlier List 122C)

Subsequently, the outlier list 122C stored in the RAM 122 will be described below. The on-board processing apparatus 120 performs position estimation of the vehicle 1 in the car-park coordinate system by using the point group map 124A and the local surrounding information 122B as described later in detail. The outlier list 122C stores information of the local surrounding information 122B not to be processed in the position estimation of the vehicle 1. During the position estimation of the vehicle 1, the outlier list 122C is updated by the on-board processing apparatus 120 as appropriate as described later.

(Local Surrounding Information 122B)

Subsequently, the local surrounding information 122B stored in the RAM 122 will be described below. As described above, the local surrounding information 122B is used when the position estimation of the vehicle 1 in the car-park coordinate system is performed. The local surrounding information 122B stores the coordinate value of each point included in a landmark detected by the on-board processing apparatus 120 in a position estimation mode to be described later. The coordinate value is set in accordance with a unique coordinate system that is set with reference to the position and posture of the vehicle 1 when recording of the local surrounding information 122B is started. Hereinafter, a coordinate system expressing each coordinate value of the local surrounding information 122B is referred to as a "local coordinate system". For example, the origin of the local coordinate system is set to be the position of the vehicle 1 at the start of recording of the local surrounding information 122B, the Y axis of the local coordinate system is set to be the traveling direction of the vehicle 1, and the X axis of the local coordinate system is set to be the right direction of the vehicle 1. Specifically, in the local surrounding information 122B, a place that is on a travel path traveled by the vehicle 1 and different from that in the point group map 124A described above is set as a reference position (second reference position), and the relative position of each point with respect to the second reference position is indicated.

(Overview of Operation of On-Board Processing Apparatus 120)

Figure 3:
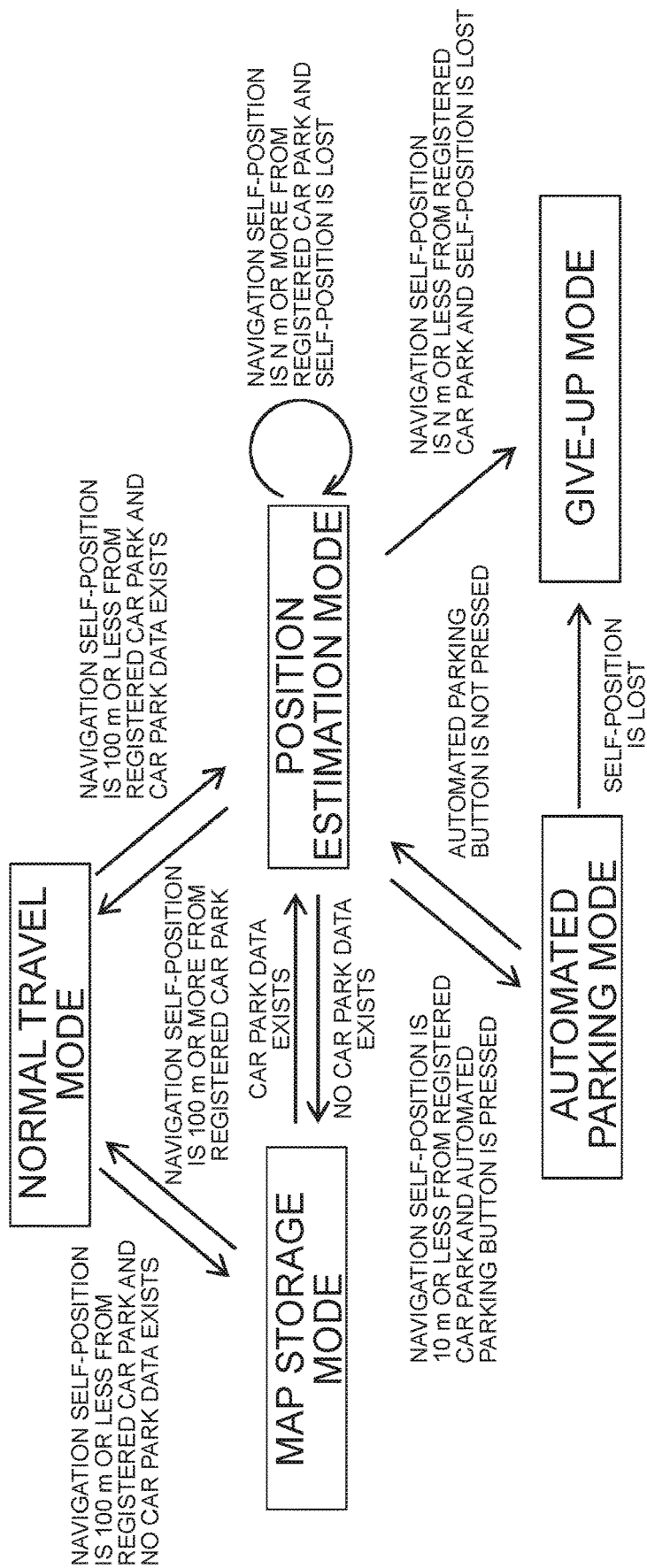
FIG. 3 is a diagram for description of operation modes of an on-board processing apparatus and transition conditions thereof.

Subsequently, an overview of operation of the on-board processing apparatus 120 will be described below. FIG. 3 is a diagram for description of operation modes of the on-board processing apparatus 120 and transition conditions thereof. The on-board processing apparatus 120 has the five operation modes illustrated in FIG. 3, namely, a normal travel mode, a map storage mode, the position estimation mode, an automated parking mode, and a give-up mode. These operation modes are switched in accordance with a situation by the mode switching unit 121I.

The on-board processing apparatus 120 starts in the normal travel mode. In the normal travel mode, the vehicle 1 is driven by the user. In this case, the on-board processing apparatus 120 does not perform generation of the point group map 124A and estimation of the own-vehicle position in the point group map 124A but only performs monitoring of a mode transition condition. In the normal travel mode, the mode transition condition is monitored based on the position of the vehicle 1 (hereinafter referred to as a "navigation self-position") acquired from the car navigation system 107 and the point group map 124A. Specifically, the latitude and longitude of a car park (registered car park) that is registered by the user in advance and in which the vehicle 1 is to be parked are compared with the latitude and longitude of the navigation self-position. As a result, when the vehicle 1 is within a certain range of, for example, 100 m from the registered car park, it is determined that the mode transition condition is satisfied, mode transition from the normal travel mode is performed. In this case, transition to the map storage mode is performed when no car park data near a travel place where the vehicle 1 is currently traveling exists in the point group map 124A, or transition to the position estimation mode is performed when such car park data exists.

Whether car park data near the travel place exists in the point group map 124A may be determined based on latitude-longitude information corresponding to the coordinate value of a landmark included in each piece of car park data in the point group map 124A. Specifically, the latitude and longitude of the navigation self-position are compared with the latitude-longitude information of a landmark in each piece of car park data in the point group map 124A, the distance between the travel place and the landmark is calculated from the latitude-longitude difference. As a result, it is determined that car park data near the travel place exists when there is a landmark, the calculated distance of which is within a certain range determined in advance, for example, 10 m, or it is determined that no car park data near the travel place exists when there is no such landmark.

In the map storage mode, the vehicle 1 is driven by the user. In this case, the on-board processing apparatus 120 performs landmark positioning based on detection information of surroundings of the vehicle 1, which is acquired from the external sensor group 102 included in the vehicle 1, and collects point group data from which car park data is to be produced, in other words, information of a plurality of points representing a white line, an obstacle, a parking position, a travel path, and the like existing in the registered car park. The on-board processing apparatus 120 produces car park data by using the collected point group data and stores the car park data as part of the point group map 124A in the storage unit 124.

During execution of the map storage mode, similarly to the normal travel mode, the on-board processing apparatus 120 compares the latitude and longitude of the registered car park with the latitude and longitude of the navigation self-position. As a result, when the vehicle 1 is out of a certain range of, for example, 100 m from the registered car park, transition to the normal travel mode is performed. When the vehicle 1 has entered an area for which car park data exists during execution of the map storage mode, transition to the position estimation mode is performed. In this case, whether the vehicle 1 has entered the area for which car park data exists can be determined by a method same as the method for the existence of car park data near the travel place in the normal travel mode. Specifically, the latitude and longitude of the navigation self-position are compared with the latitude-longitude information of a landmark in each piece of car park data in the point group map 124A, and the distance between the travel place and the landmark is calculated from the latitude-longitude difference. As a result, it is determined that the vehicle 1 has entered the area for which car park data exists when there is a landmark the calculated distance of which is within a certain range determined in advance, for example, 10 m, or it is determined that the vehicle 1 has not entered when there is no such landmark.

In the position estimation mode, the vehicle 1 is driven by the user. In this case, the on-board processing apparatus 120 collates detection information of surroundings of the vehicle 1, which is acquired from the external sensor group 102 included in the vehicle 1, and information of the point group map 124A, and estimates the position of the vehicle 1 in the car-park coordinate system. Specifically, the on-board processing apparatus 120 detects a white line and an obstacle in the registered car park, which exist in surroundings of the vehicle 1, based on the detection information from the external sensor group 102 and collates the positions thereof with the coordinate value of each landmark in car park data expressed by the point group map 124A, thereby estimating the current position of the vehicle 1 in the car-park coordinate system.

During execution of the position estimation mode, similarly to the normal travel mode and the map storage mode, the on-board processing apparatus 120 compares the latitude and longitude of the registered car park with the latitude and longitude of the navigation self-position. As a result, when the vehicle 1 is out of a certain range of, for example, 100 m from the registered car park, transition to the normal travel mode is performed. When the vehicle 1 has entered an area for which no car park data exists during execution of the position estimation mode, transition to the map storage mode is performed. In this case, whether the vehicle 1 has entered the area for which no car park data exists can be determined by a method opposite to a condition on transition from the map storage mode to the position estimation mode. Specifically, the latitude and longitude of the navigation self-position are compared with the latitude-longitude information of a landmark in each piece of car park data in the point group map 124A, and the distance between the travel place and the landmark is calculated from the latitude-longitude difference. As a result, it is determined that the vehicle 1 has entered the area for which no car park data exists when there is no landmark, the calculated distance of which is out of a certain range determined in advance, for example, 10 m, or it is determined that the vehicle 1 has not entered when there is such a landmark. In addition, when the vehicle 1 approaches a parking position during execution of the position estimation mode and the user instructs execution of automated parking by continuously pressing down the automated parking button 110B as a dead man switch, transition to the automated parking mode is performed. When a state in which the position estimation is not successful and the position of the vehicle 1 in the car-park coordinate system is lost continues, transition to the give-up mode is performed.

In the automated parking mode, travel of the vehicle 1 is controlled by the on-board processing apparatus 120, and the vehicle 1 automatically moves in the registered car park without a driving operation by the user. In this case, the on-board processing apparatus 120 moves the vehicle 1 to a parking position specified by the user and parks the vehicle 1 at the parking position based on the position of the vehicle 1 in the car-park coordinate system, which is obtained in the position estimation mode. In the automated parking mode as well, following the position estimation mode, the on-board processing apparatus 120 estimates the position of the vehicle 1 in the car-park coordinate system. Specifically, the on-board processing apparatus 120 detects a white line and an obstacle in the registered car park, which exist in surroundings of the vehicle 1, based on detection information from the external sensor group 102 and collates the positions thereof with the point group map 124A, thereby estimating the current position of the vehicle 1 in the car-park coordinate system.

When pressing of the automated parking button 110B is canceled by the user during execution of the automated parking mode, travel control of the vehicle 1 is stopped and transition to the position estimation mode is performed.

When the position estimation is not successful and the position of the vehicle 1 in the car-park coordinate system is lost while the user presses down the automated parking button 110B, transition to the give-up mode is performed.

In the give-up mode, the on-board processing apparatus 120 presents, to the user, that automated parking is impossible through the display apparatus 111. In the present mode, the on-board processing apparatus 120 does not perform storage of the point group map 124A, estimation of the position of the vehicle 1 in the car-park coordinate system, nor automated parking control. When the user completes parking of the vehicle 1 or the vehicle 1 is separated from the registered car park by a predetermined distance or more in the give-up mode, transition to the normal travel mode is performed.

The on-board processing apparatus 120 executes each operation mode as described above. In the following, the map storage mode, the position estimation mode, and the automated parking mode will be sequentially described in detail.

(Map Storage Mode)

As described above, when the vehicle 1 has entered a predetermined range centered at the registered car park and no car park data near the travel place is recorded in the point group map 124A, the on-board processing apparatus 120 operates in the map storage mode. While operating in the map storage mode, the on-board processing apparatus 120 displays, on a screen of the display apparatus 111, that the on-board processing apparatus 120 is operating in the map storage mode, and collects the point group data 122A by performing landmark positioning.

In the map storage mode, the point group data verification unit 121B starts operating when the user stops the vehicle 1 after moving the vehicle 1 to a parking position and then actuates the parking brake. The point group data verification unit 121B verifies whether the point group data 122A collected in the map storage mode holds as the point group map 124A, in other words, whether the collected point group data 122A can be used for the position estimation of the vehicle 1 in the position estimation mode and the automated parking mode. When the collected point group data 122A cannot be used for the position estimation, automated parking fails because the position estimation cannot be performed by using the point group map 124A produced by using the collected point group data 122A, and thus the verification is performed to prevent this failure.

The point group data verification unit 121B may set a verification interval of, for example, a predetermined interval on the travel locus of the vehicle 1 and verify, with reference to two verification factors of local formability and autonomous navigability, whether the point group data 122A acquired at each verification interval can be used for the position estimation. The local formability as the former verification factor can be determined based on, for example, the state of distribution of a plurality of points in the point group data 122A. Specifically, it is determined that the local formability is satisfied, for example, when the density of the point group data 122A acquired in the verification interval is equal to or higher than a predetermined value and there is no identical distribution pattern. The autonomous navigability as the latter verification factor can be determined based on, for example, an error in estimation of the movement amount of the vehicle 1 or an allowable accuracy for control of the vehicle 1. Specifically, for example, an error in the position estimation of the vehicle 1 in a well-known dead reckoning technology using the vehicle speed sensor 108 and the rudder angle sensor 109 is acquired from the sensor error database 150, and an allowable position accuracy for control of the vehicle 1, which is determined in advance for a path width and a parking area size in a car park is acquired from the environment database 151. Then, a travel distance that the vehicle 1 can travel by autonomous navigation is calculated based on these acquired pieces of information, thereby determining whether the autonomous navigability is satisfied.

It may be determined that the collected point group data 122A can be used for the position estimation even when the above-described two verification factors are both not satisfied. For example, when the error in the position estimation by autonomous navigation is within a sufficiently small allowable accuracy in a verification interval for which the local formability does not hold, it is determined that the point group data 122A acquired in the verification interval can be used for the position estimation and holds as the point group map 124A. In this case, when the local formability does not hold and the error in the position estimation by autonomous navigation is larger than the allowable accuracy, it is determined that the point group data 122A cannot be used for the position estimation.

When it is determined by the point group data verification unit 121B that the point group data 122A can be used for the position estimation, the on-board processing apparatus 120 displays a predetermined message or image on the display apparatus 111 to query the user for whether the point group data 122A acquired this time is to be recorded in the point group map 124A. When the response button 110A is pressed down by the user in response to the query, the on-board processing apparatus 120 produces car park data included in the point group map 124A by using the acquired point group data 122A through the point group map generation unit 121C, records the produced car park data in the storage unit 124, and ends the map storage mode. When it is determined by the point group data verification unit 121B that the point group data 122A cannot be used for the position estimation, the on-board processing apparatus 120 displays, on the display apparatus 111, that the point group data 122A acquired this time does not sufficiently have information necessary for the point group map 124A. Then, similarly to the case in which it is determined that the point group data 122A can be used for the position estimation, when the response button 110A is pressed down by the user, the on-board processing apparatus 120 produces car park data included in the point group map 124A by using the acquired point group data 122A, records the produced car park data in the storage unit 124, and ends the map storage mode. In this case, a message that prompts the user to travel the same path again and acquire the necessary point group data 122A may be displayed. Alternatively, the map storage mode may be ended without producing car park data. In this case, the point group map 124A is not updated.

The operation of the on-board processing apparatus 120 in the map storage mode is divided into the two pieces of processing of extracting the point group data 122A included in a landmark and recording the point group map 124A based on the extracted point group data 122A. First, the processing of extracting the point group data 122A by the on-board processing apparatus 120 will be described below.

When transition is made to the map storage mode, the on-board processing apparatus 120 reserves a temporary record area in the RAM 122. Then, the on-board processing apparatus 120 repeats processing as follows until the map storage mode ends or transition is made to another mode. Specifically, the on-board processing apparatus 120 extracts the point group data 122A related to a plurality of points representing a landmark based on detection information acquired from the external sensor group 102 by landmark positioning, for example, a captured image of the camera 102A and observation information of the sonar 102B and the radar 102C. In addition, the on-board processing apparatus 120 calculates, based on outputs from the vehicle speed sensor 108 and the rudder angle sensor 109, a movement amount by which and a movement direction in which the vehicle 1 has moved until the current image capturing since the previous image capturing by the camera 102A. Then, the on-board processing apparatus 120 calculates the coordinate value of each point included in the extracted point group data 122A based on the positional relation with the vehicle 1 and the movement amount and movement direction of the vehicle 1, and records the calculated coordinate value in the RAM 122. In addition, the on-board processing apparatus 120 calculates the latitude and longitude of each point based on a latitude and a longitude output from the car navigation system 107 and records the calculated latitude and longitude. The on-board processing apparatus 120 repeats this processing in the map storage mode.

In the above-described processing, the coordinate value of each point in the point group data 122A is recorded as a coordinate value in a coordinate system set with reference to the position of the vehicle 1 when recording of the point group data 122A is started. Hereinafter, this coordinate system is referred to as a "recording coordinate system". For example, the origin of the recording coordinate system is set to be the position of the vehicle 1 when recording of the point group data 122A is started, the Y axis of the recording coordinate system is set to be the traveling direction (posture) of the vehicle 1, and the X axis of the recording coordinate system is set to be the right direction of the vehicle 1. Thus, the coordinate value of a point representing the same landmark is not necessarily constant for the point group data 122A recorded in an identical car park because a different recording coordinate system is set when the position or posture of the vehicle 1 at the start of the recording is different.

Subsequently, the processing of recording the point group map 124A based on the point group data 122A by the on-board processing apparatus 120 will be described below.

When the response button 110A is pressed down by the user to approve recording of the point group map 124A after parking of the vehicle 1 is completed, the on-board processing apparatus 120 calculates the coordinate value of a parking area based on the current position of the vehicle 1 and records the calculated coordinate value in the RAM 122. The coordinate value of the parking area is recorded as, for example, the coordinate values of the four corners of a rectangular shape to which the vehicle 1 is approximated. The coordinate value of the parking area may be determined with taken into account the difference between the vehicle 1 and the size of the parking area. Subsequently, the on-board processing apparatus 120 performs the processing of recording the point group map 124A based on the point group data 122A as described below.

The on-board processing apparatus 120 determines whether the difference between the current position of the vehicle 1 at parking completion, in other words, the latitude and longitude of a parking position and the latitude and longitude of any parking area in car park data already recorded in the point group map 124A is in a predetermined range. As a result, when there is no car park data including a parking area, the latitude-longitude difference of which from the parking position is in the predetermined range, the on-board processing apparatus 120 records, in the point group map 124A as new car park data, the point group data 122A stored in the RAM 122. When there is car park data including a parking area, the latitude-longitude difference of which from the parking position is in the predetermined range, the on-board processing apparatus 120 determines whether to merge, as data of the same car park with the car park data, information of the point group data 122A stored in the RAM 122. For this determination, the on-board processing apparatus 120 first performs coordinate transform of the point group data 122A so that the position of the parking area included in the car park data matches with a parking position in the point group data 122A recorded in the RAM 122. Subsequently, the on-board processing apparatus 120 calculates a point group matching rate indicating the degree of matching between the point group data 122A after the coordinate transform and the point group map 124A. Then, it is determined that both pieces of data are to be integrated when the calculated point group matching rate is higher than a predetermined threshold value, or it is determined that both pieces of data are not to be integrated when the calculated point group matching rate is equal to or lower than the threshold value. Specific contents of these pieces of processing will be described later.

As a result of the above-described determination, when having determined that both pieces of data are not to be integrated, the on-board processing apparatus 120 records, in the point group map 124A as new car park data, the point group data 122A stored in the RAM 122. When having determined that both pieces of data are to be integrated, the on-board processing apparatus 120 adds the information of the point group data 122A stored in the RAM 122 to the existing car park data in the point group map 124A.

(Flowchart of Map Storage Mode)

Figure 4:
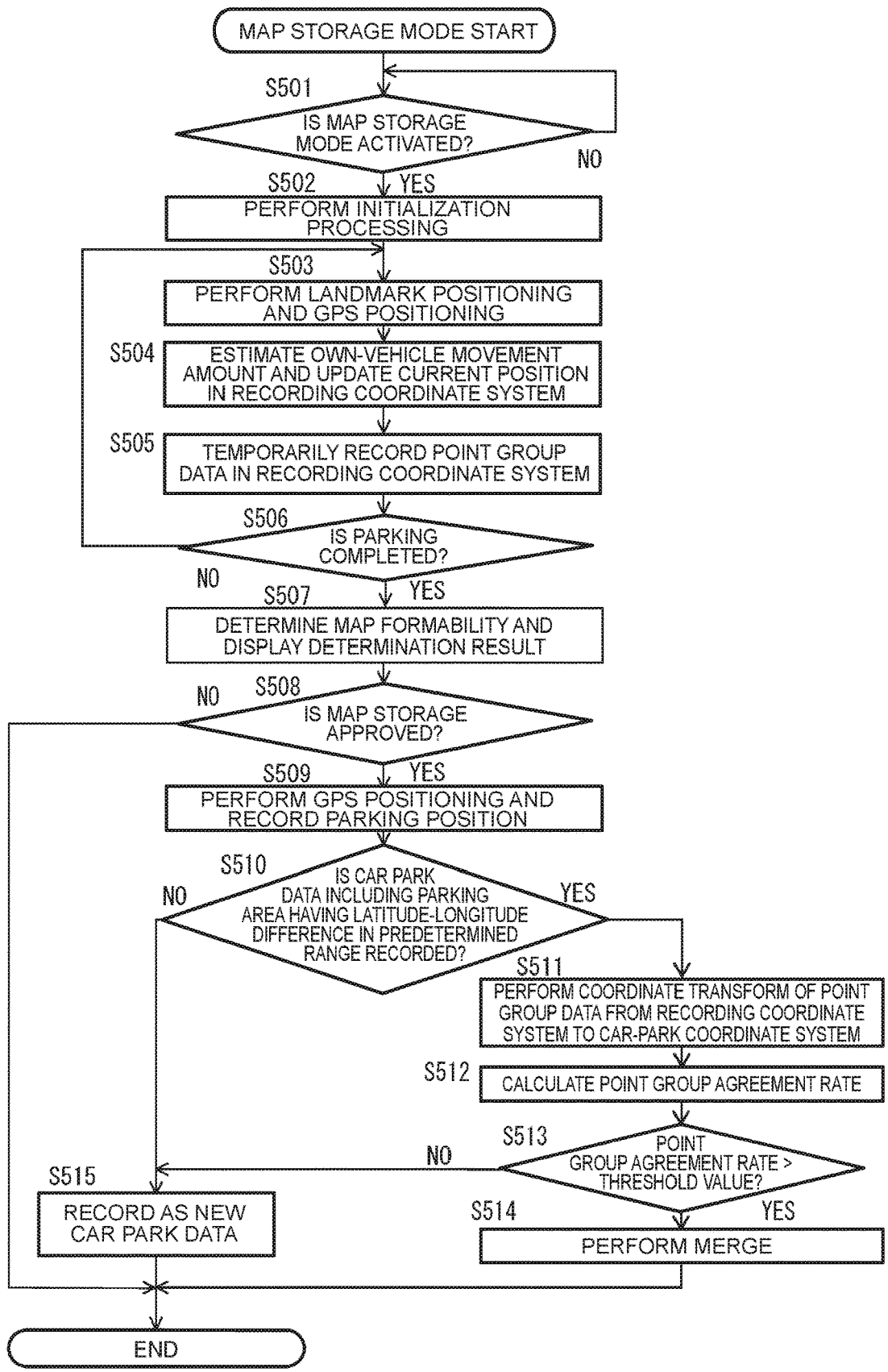
FIG. 4 is a flowchart illustrating processing executed by the on-board processing apparatus in a map storage mode.

FIG. 4 is a flowchart illustrating processing executed by the on-board processing apparatus 120 in the map storage mode. The executor of each step described below is the calculation unit 121 of the on-board processing apparatus 120. When performing the processing illustrated in FIG. 4, the calculation unit 121 functions as the point group data acquisition unit 121A, the point group data verification unit 121B, the point group map generation unit 121C, the absolute position acquisition unit 121D, the movement amount estimation unit 121E, and the display control unit 121G.

At step S501, the calculation unit 121 determines whether the map storage mode is activated. When having determined that the map storage mode is activated, the calculation unit 121 proceeds to S502. When the map storage mode is not activated, the calculation unit 121 stays at step S501.

At step S502, the calculation unit 121 performs initializing processing. In this process, a new storage area is reserved in the RAM 122. In this storage area, the point group data 122A and the position of the vehicle 1, which are extracted by landmark positioning are recorded as coordinate values in the above-described recording coordinate system in the subsequent processing.

At step S503, the calculation unit 121 performs, through the point group data acquisition unit 121A, the above-described landmark positioning by using information acquired from the external sensor group 102. Specifically, observation values of a plurality of points representing a landmark in a car park existing in surroundings of the vehicle 1 are acquired by using a captured image of the camera 102A or observation information of the sonar 102B or the radar 102C and recorded in the RAM 122 as the point group data 122A. The point group data 122A acquired at this stage is a coordinate value indicating a relative position with respect to the current position of the vehicle 1, but is not a coordinate value in the recording coordinate system. In addition, the calculation unit 121 performs GPS positioning of calculating the current position of the vehicle 1. Specifically, latitude-longitude information based on received signals of the GPS receiver 107A, which is output from the car navigation system 107 is acquired by the absolute position acquisition unit 121D. Then, the position of each point in the point group data 122A in the absolute coordinate system is acquired by associating the current position of the vehicle 1, which is indicated by the acquired latitude-longitude information, with the observation value.

At step S504, the calculation unit 121 estimates, through the movement amount estimation unit 121E, the movement amount of the vehicle 1 until the current landmark positioning since the previous landmark positioning and updates the current position of the vehicle 1 in the recording coordinate system, which is recorded in the RAM 122. In this process, the movement amount of the vehicle 1 may be estimated by a plurality of methods. For example, as described above, the movement amount of the vehicle 1 may be estimated based on change in the position of an object existing on a road surface in a captured image of the camera 102A. When a highly accurate GPS receiver 107A having a small error is mounted on the car navigation system 107, an output from the GPS receiver 107A may be used. Alternatively, the movement amount of the vehicle 1 may be estimated based on the vehicle speed output from the vehicle speed sensor 108 and the rudder angle output from the rudder angle sensor 109. When the point group map is expressed with coordinate values on a two-dimensional plane, the estimated movement amount includes, for example, the three parameters of movement amounts $\Delta x$ and $\Delta y$ on the two-dimensional plane and $\Delta \theta$ indicating change in the direction of the vehicle on the plane. When the point group map is expressed with coordinate values in a three-dimensional space, the estimated movement amount includes, for example, the three parameters of movement amounts $\Delta x$, $\Delta y$, and $\Delta z$ in the three-dimensional space and $\Delta \theta$, $\Delta \phi$, and $\Delta \psi$ indicating change in the direction of the vehicle in the space. The parameter $\Delta \theta$ corresponds to the rotational amount about the x axis, the parameter $\Delta \phi$ corresponds to the rotational amount about the y axis, and the parameter $\Delta \psi$ corresponds to the rotational amount about the z axis. The movement amount of the vehicle 1 is estimated by using an optional method, and the current position of the vehicle 1 in the recording coordinate system is updated and then temporarily stored in the RAM 122, and the calculation unit 121 subsequently proceeds to step S505.

At step S505, the calculation unit 121 temporarily records the point group data 122A of the recording coordinate system in the RAM 122. In this process, the coordinate value of each point in the point group data 122A acquired by landmark positioning at step S503 is transformed into a coordinate value in the recording coordinate system based on the current position of the vehicle 1 updated at step S504. Then, the point group data 122A in the RAM 122 is updated with the coordinate value after the transform as the point group data 122A in the recording coordinate system. Specifically, the coordinate value of each point in the point group data 122A recorded in the RAM 122 is rewritten with reference to the position and posture of the vehicle 1 when recording of the point group data 122A is started.

At the subsequent step S506, the calculation unit 121 determines whether parking of the vehicle 1 is completed. Until the parking brake of the vehicle 1 is actuated, the calculation unit 121 determines that parking is not completed, and returns to step S503 to continue the landmark positioning and the recording of the point group data 122A. When the parking brake of the vehicle 1 is actuated, the calculation unit 121 determines that parking is completed, and proceeds to step S507.

At step S507, the calculation unit 121 determines, through the point group data verification unit 121B, map formability of the point group data 122A recorded in the RAM 122 at step S505. In this process, verification related to the formability of the point group map 124A is performs for each point in the point group data 122A by a method as described above. Having determined the map formability of the point group data 122A, the calculation unit 121 displays, through the display control unit 121G, a result of the determination on the display apparatus 111 and queries the user for whether to record the point group data 122A in the point group map 124A. Information indicating the result of the map formability determination performed at step S507 is recorded in combination with the coordinate value of each point when the point group data 122A is recorded in the point group map data 124A later at step S514 or S515.

At step S508, the calculation unit 121 determines whether storage of the point group map 124A is approved by the user. When a predetermined storage approval operation is performed by the user through the response button 110A, the calculation unit 121 determines that storage of the point group map 124A is approved, and proceeds to step S509. When the storage approval operation is not performed by the user, the calculation unit 121 determines that storage of the point group map 124A is not approved, and ends the flowchart of FIG. 4. In this case, the point group data 122A recorded in the RAM 122 is discarded, and the point group map 124A is not recorded.

At step S509, the calculation unit 121 performs GPS positioning to calculate the parking position of the vehicle 1. Specifically, the latitude-longitude information based on received signals of the GPS receiver 107A, which is output from the car navigation system 107 is acquired by the absolute position acquisition unit 121D to acquire the latitude and longitude of the parking position. Then, the coordinate value of a parking area corresponding to the parking position in the recording coordinate system is recorded based on the acquired latitude and longitude. Specifically, the coordinate value of the parking position in the recording coordinate system is calculated from the difference between the latitude and longitude of the current position of the vehicle 1, which are acquired last at step S503, and the latitude and longitude of the parking position, which are acquired at step S509, and the coordinate values of four apexes of the parking area corresponding to the parking position are calculated based on the calculated coordinate value and recorded in the RAM 122.

At step S510, the calculation unit 121 determines whether car park data including a parking area, the latitude-longitude difference of which from the parking position acquired at step S509 is in a predetermined range is already recorded in the point group map 124A. In this process, the calculation unit 121 determines whether there are a latitude and a longitude, the difference of which from the latitude and longitude of the parking position is in the predetermined range among latitudes and longitudes corresponding to the coordinate values of parking areas included in each piece of car park data already recorded in the point group map 124A. As a result, when a parking area, the latitude-longitude difference of which from the parking position is in the predetermined range exists in the point group map 124A, the calculation unit 121 proceeds to step S511. When no such parking area exists, the calculation unit 121 proceeds to step S515. In this case, it may be determined that car park data corresponding to the parking position is already recorded in the point group map 124A only when the latitude-longitude difference from the parking position is in the predetermined range for all four apexes of the parking area. Hereinafter, car park data in the point group map 124A including a parking area for which it is determined at step S510 that the latitude-longitude difference from the parking position is in the predetermined range is referred to as "target car park data".

At step S511, the calculation unit 121 performs, through the point group map generation unit 121C, coordinate transform of the point group data 122A recorded in the RAM 122 at step S505 from the recording coordinate system to the car-park coordinate system of the target car park data. In this process, a formula of coordinate transform from the recording coordinate system to the car-park coordinate system is derived so that the latitude and longitude of the parking area in the target car park data match with the latitude and longitude of the parking position acquired at step S509. Then, the coordinate transform formula is used to transform, into coordinate values in the car-park coordinate system of the target car park data, the coordinate values of points respectively representing a landmark and the current position of the vehicle 1 in the point group data 122A stored in the recording coordinate system in the RAM 122.

At step S512, the calculation unit 121 calculates a point group matching rate IB of the point group data 122A subjected to the coordinate transform at step S511 and the target car park data. The point group matching rate IB is calculated by, for example, Expression (1) below.

$$IB = 2 * Din / (D1 + D2) \quad (1)$$

In Expression (1), "Din" represents the number of points, the distance of each of which from any point in the target car park data is equal to or shorter than a predetermined value among points in the point group data 122A subjected to the coordinate transform at step S511. In Expression (1), "D1" represents the number of points in the point group data 122A stored in the RAM 122, and "D2" represents the number of points of the target car park data in the point group data 122A. Having calculated the point group matching rate IB at step S512, the calculation unit 121 subsequently proceeds to step S513.

At step S513, the calculation unit 121 determines whether the point group matching rate IB calculated at step 512 is higher than a predetermined threshold value. As a result, when having determined that the point group matching rate IB is higher than the threshold value, the calculation unit 121 proceeds to step S514. When having determined that the point group matching rate IB is equal to or lower than the threshold value, the calculation unit 121 proceeds to step S515.

At step S514, the calculation unit 121 performs, through the point group map generation unit 121C, processing of merging the point group data 122A subjected to the coordinate transform at step S511 with the target car park data. In this process, the merge processing is performed to generate a new point group map 124A by adding the point group data 122A subjected to the coordinate transform at step S511 to the target car park data in the point group map 124A stored in the storage unit 124. After the merge processing at step 514 is completed, the flowchart of FIG. 4 is ended.

At step S515, which is executed when the negative determination is performed at step S510 or S513, the calculation unit 121 records, through the point group map generation unit 121C, in the point group map 124A as new car park data, the point group data 122A subjected to the coordinate transform at step S511 and the latitude and longitude of the parking position and the coordinate value of the parking area corresponding to the parking position, which are acquired at step S509. After the processing at step 515 is completed, the flowchart of FIG. 4 is ended.

(Position Estimation Mode)

As described above, when the vehicle 1 is driven and moved near the registered car park by the user and it is determined that car park data of surroundings of the vehicle 1 is already recorded in the point group map 124A, the on-board processing apparatus 120 transitions to the position estimation mode.

(Flowchart of Position Estimation Mode)

Figure 5:
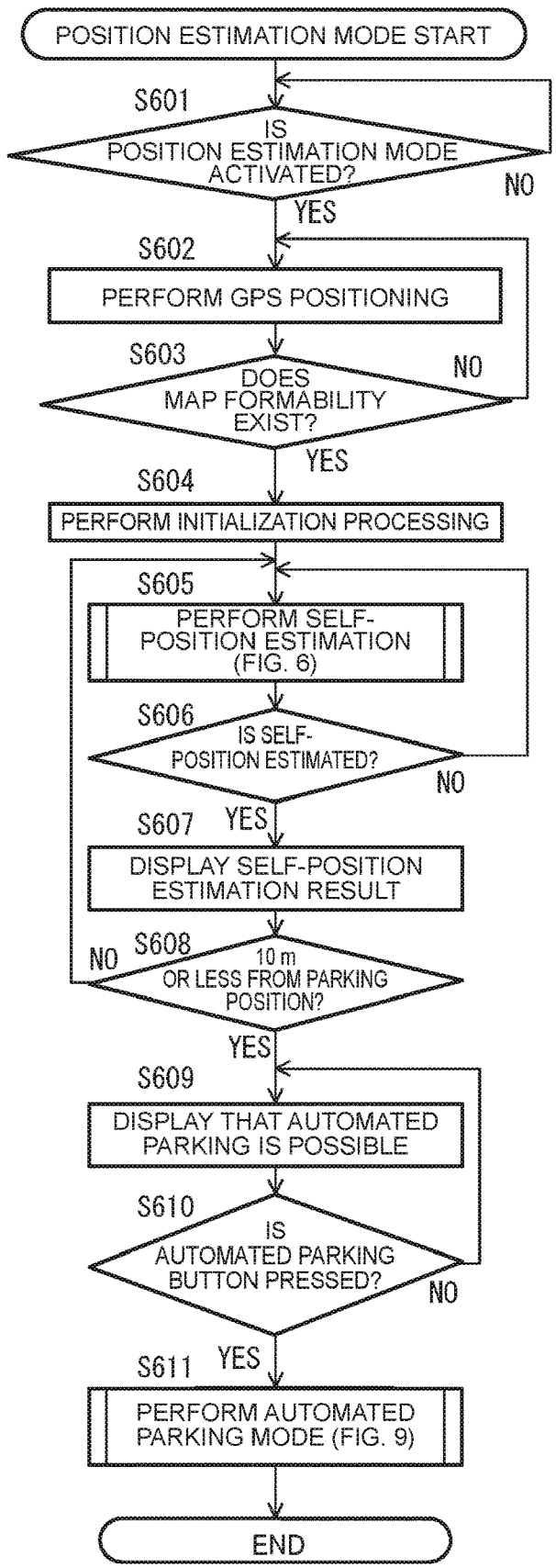
FIG. 5 is a flowchart illustrating processing executed by the on-board processing apparatus in a position estimation mode.

FIG. 5 is a flowchart illustrating processing executed by the on-board processing apparatus 120 in the position estimation mode. The executor of each step described below is the calculation unit 121 of the on-board processing apparatus 120. When performing the processing illustrated in FIG. 5, the calculation unit 121 functions as the point group data acquisition unit 121A, the absolute position acquisition unit 121D, the movement amount estimation unit 121E, the position estimation unit 121F, and the display control unit 121G.

At step S601, the calculation unit 121 determines whether the position estimation mode is activated. When having determined that the position estimation mode is activated, the calculation unit 121 proceeds to S602. When the position estimation mode is not activated, the calculation unit 121 stays at step S601.

At step S602, the calculation unit 121 performs GPS positioning to calculate the current position of the vehicle 1. Specifically, the latitude-longitude information based on received signals of the GPS receiver 107A, which is output from the car navigation system 107 is acquired by the absolute position acquisition unit 121D to acquire the latitude and longitude corresponding to the current position of the vehicle 1.

At step S603, the calculation unit 121 determines the existence of the map formability of the point group map 124A in surroundings of the current position of the vehicle 1. In this process, in car park data included in the point group map 124A, the existence of car park data including, in path data, a point having a latitude and a longitude in a certain range from the current position of the vehicle 1 and having map formability is determined. The existence of the map formability can be determined based on the above-described information recorded at step S507 in FIG. 4 when the point group data 122A acquired in the map storage mode is recorded in the point group map 124A. As a result, when car park data that satisfies the above-described condition exists in the point group map 124A, the calculation unit 121 determines that the map formability exists for the point group map 124A in surroundings of the current position of the vehicle 1, and proceeds to step S604. When no car park data that satisfies the condition exists in the point group map 124A, the calculation unit 121 determines that no map formability exists for the point group map 124A in surroundings of the current position of the vehicle 1, and returns to step S602 to continue the GPS positioning.

At step S604, the calculation unit 121 performs initialization processing. In this process, the calculation unit 121 performs initialization of the local surrounding information 122B stored in the RAM 122 and initialization of the current position of the vehicle 1 stored in the RAM 122. Specifically, any existing recorded information is deleted, and a new coordinate system is set as the above-described local coordinate system. The local coordinate system is set based on the position and posture of the vehicle 1 when step S604 is executed. For example, the origin of the local coordinate system is set to be the position of the vehicle 1 when step S604 is executed, and the X and Y axes of the local coordinate system are set based on the direction of the vehicle 1 when step S604 is executed. In the initialization of the current position of the vehicle 1, the origin (0, 0) is set to be the current position of the vehicle 1.

At step S605, the calculation unit 121 performs self-position estimation through the position estimation unit 121F. In this process, the current position of the vehicle 1 in the car-park coordinate system is estimated in accordance with the procedure of a flowchart illustrated in FIG. 6 to be described later.

At step S606, the calculation unit 121 determines whether the self-position, in other words, the current position of the vehicle 1 in the car-park coordinate system is estimated at step S605. In this process, whether the self-position is correctly estimated is determined based on a result of self-position diagnosis performed at step S627 in the flowchart illustrated in FIG. 6 to be described later. As a result, when it is determined by the self-position diagnosis that the reliability of the self-position is high, the calculation unit 121 determines that the self-position is correctly estimated, and proceeds to step S607. When it is determined that the reliability of the self-position is low, the calculation unit 121 determines that the self-position is not correctly estimated, and returns to step S605 to continue the self-position estimation.

At step S607, the calculation unit 121 displays, through the display control unit 121G, a result of the self-position estimation at step S605 on the display apparatus 111. In this process, the calculation unit 121 causes the display apparatus 111 to display, based on the result of the self-position estimation, for example, a map image indicating the positional relation between an object in surroundings of the vehicle 1 and the vehicle 1, which is expressed in the point group map 124A, so that the user can recognize the estimation result of the self-position in a car park. Alternatively, the calculation unit 121 may generate, by using a captured image acquired from the camera 102A, a panoramic image illustrating the status of the vehicle 1 when viewed from above, and cause the display apparatus 111 to display the panoramic image, thereby indicating the positional relation between an object in surroundings of the vehicle 1 and the vehicle 1, which is expressed in the point group map 124A on the panoramic image.

At step S608, the calculation unit 121 determines whether the self-position displayed at step S607 is within a predetermined distance, for example, 10 m or less from any parking position in car park data in the point group map 124A. Until the self-position is within 10 m from the parking position, the calculation unit 121 returns to step S605 to continue the self-position estimation. When the self-position is within 10 m, the calculation unit 121 proceeds to step S609. Specifically, when the difference between the coordinate value of the parking position in the car-park coordinate system expressed in the point group map 124A and the position of the vehicle 1 estimated at step S605 is shorter than the predetermined distance, the calculation unit 121 performs the positive determination at step S608 and proceeds to the next step S609.

At step S609, the calculation unit 121 displays, through the display control unit 121G, on the display apparatus 111 that automated parking is possible. This queries the user for whether to perform automated parking of the vehicle 1.

At step S610, the calculation unit 121 determines whether the automated parking button 110B is pressed by the user. When the automated parking button 110B is not pressed by the user, the calculation unit 121 returns to step S609 to continue the display that automated parking is possible. When the automated parking button 110B is pressed by the user, the calculation unit 121 proceeds to step S611.

At step S611, the calculation unit 121 switches, through the mode switching unit 121I, the operation mode of the on-board processing apparatus 120 from the position estimation mode to the automated parking mode. Then, the calculation unit 121 executes operation in the automated parking mode in accordance with the procedure of a flowchart illustrated in FIG. 9 to be described later. Having executed the automated parking mode at step S611, the calculation unit 121 ends the flowchart of FIG. 5.

(Flowchart of Self-Position Estimation)

Figure 6:
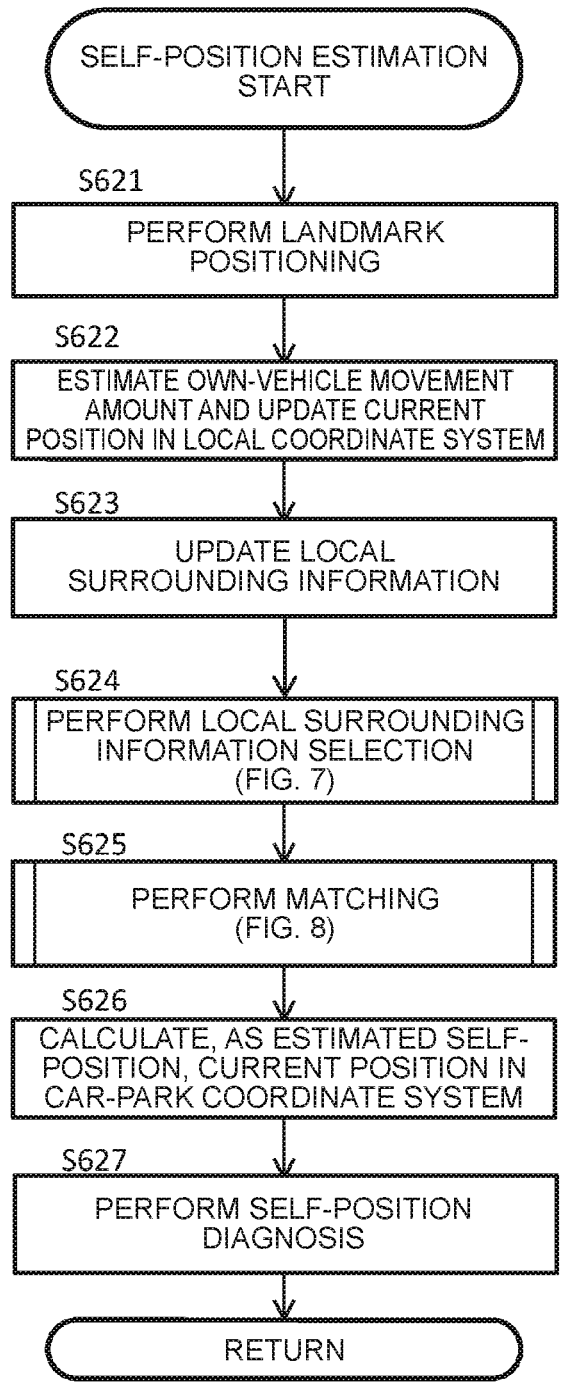
FIG. 6 is a flowchart illustrating self-position estimation processing.

FIG. 6 is a flowchart illustrating self-position estimation processing executed by the on-board processing apparatus 120 at step S605 in FIG. 5.

At steps S621 to S623, the calculation unit 121 performs processing same as that of steps S503 to 505 in FIG. 4, respectively, and acquires the local surrounding information 122B. Specifically, at step S621, the calculation unit 121 performs landmark positioning in a procedure same as that of step S503 to acquire observation values of a plurality of points representing a landmark in a car park existing in surroundings of the vehicle 1, and records the observation values in the RAM 122 as the point group data 122A. At step S622, the calculation unit 121 estimates the movement amount of the vehicle 1 in a procedure similar to that of step S504 and updates the current position of the vehicle 1 in the local coordinate system. At step S623, the calculation unit 121 transforms, based on the current position of the vehicle 1 updated at step S622, the observation value of each point in the point group data 122A acquired by landmark positioning at step S621 into a coordinate value in the local coordinate system in a procedure similar to that of step S505, and temporarily records the transformed observation value in the RAM 122 as the local surrounding information 122B. Accordingly, the calculation unit 121 newly generates the local surrounding information 122B in accordance with the current position of the vehicle 1 and updates the contents of the local surrounding information 122B in the RAM 122.

When the execution of step S623 is completed, the calculation unit 121 selects, at step S624, the local surrounding information 122B updated at step S623. In this process, the calculation unit 121 selects, in accordance with the procedure of a flowchart illustrated in FIG. 7 to be described later, a point to be used later in matching processing from among points, the coordinate value of each of which is recorded as the local surrounding information 122B. Specifically, the points in the local surrounding information 122B may include a point for which matching cannot be performed because of difference in the shape of distribution from the point group map 124A due to a cumulative error in estimation of the movement amount of the vehicle 1. Thus, through the selection processing of the local surrounding information 122B performed at step S623, a range of points that each have a small error and for which matching can be performed are adaptively selected from the local surrounding information 122B.

Figure 8:
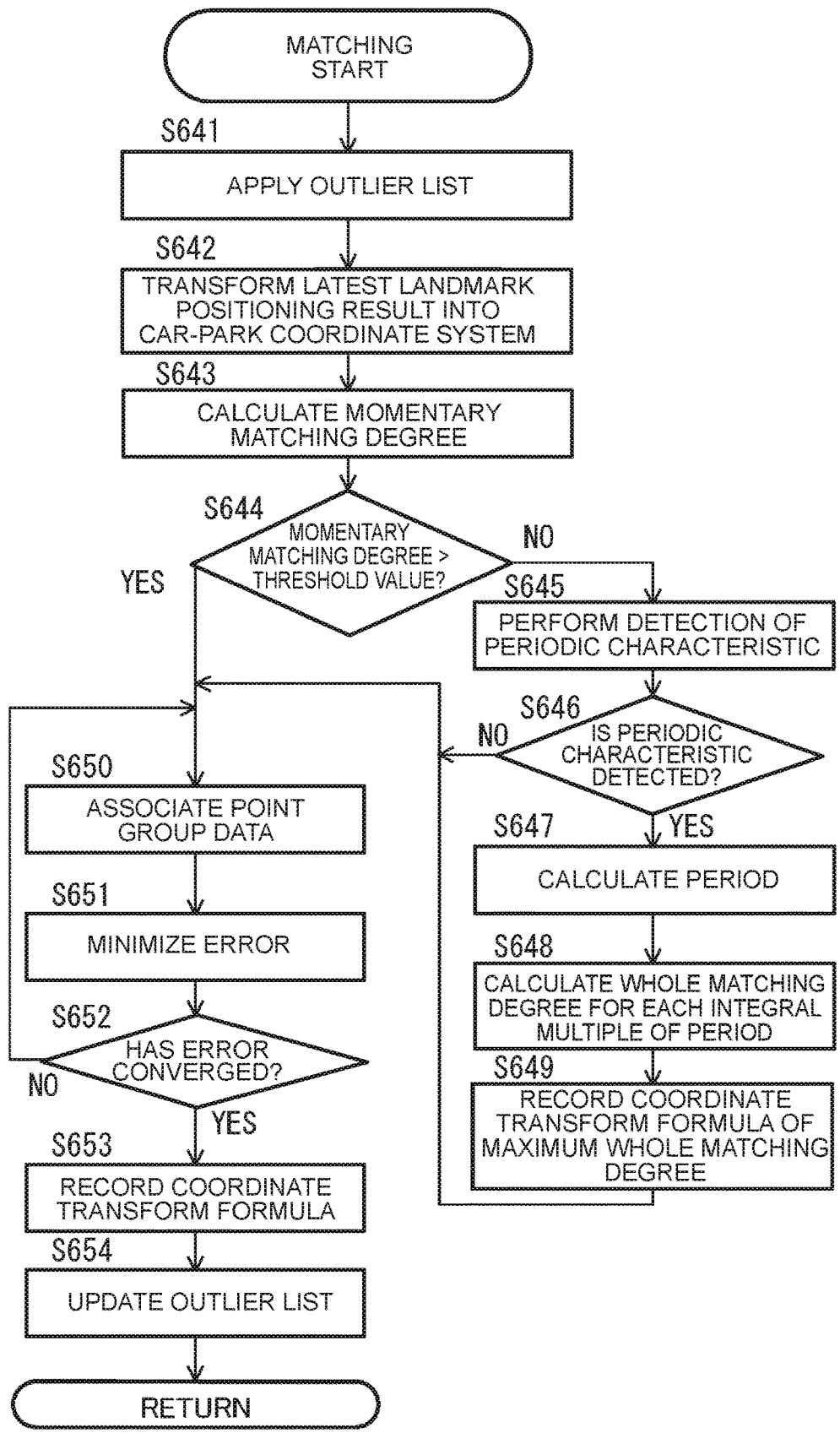
FIG. 8 is a flowchart illustrating matching processing.

When the execution of step S624 is completed, the calculation unit 121 performs matching processing illustrated in detail in FIG. 8 at step S625. In the matching processing, a relational expression indicating the correspondence relation between the local coordinate system and the car-park coordinate system, in other words, a formula of coordinate transform from the local coordinate system to the car-park coordinate system is obtained. As described above, the car-park coordinate system is a coordinate system used in the point group map 124A and set by using a place on the past travel path of the vehicle 1 as the reference position (first reference position). The local coordinate system is a coordinate system used in the local surrounding information 122B and set by using a place on the past travel path of the vehicle 1, which is different from that of the car-park coordinate system, as the reference position (second reference position). In other words, in the matching processing at step S625, the calculation unit 121 calculates a relational expression indicating the relation between the first reference position in the point group map 124A (car-park coordinate system) and the second reference position in the local surrounding information 122B (local coordinate system).

At the subsequent step S626, the calculation unit 121 calculates the coordinates of the vehicle 1 in the car-park coordinate system, in other words, an estimated self-position by using the coordinates of the vehicle 1 in the local coordinate system updated at step S622 and the coordinate transform formula obtained at step S625. Having calculated the estimated self-position in this manner, the calculation unit 121 subsequently proceeds to step S627.

At step S627, the calculation unit 121 executes self-position diagnosis on the estimated self-position calculated at step S626. In this process, the reliability of the self-position estimated at step S626 is determined by using, for example, three indexes as follows.

The first index is an error in the current position in the local coordinate system. Specifically, the movement amount of the vehicle 1 estimated by the well-known dead reckoning technology by using outputs from the vehicle speed sensor 108 and the rudder angle sensor 109 is compared with the movement amount of the self-position estimated at step S626 in a predetermined duration. As a result, when the difference therebetween is larger than a threshold value determined in advance, it is determined that the reliability of the self-position is low.

The second index is an error amount between corresponding points, which is calculated at matching. Specifically, when the error amount between corresponding points is larger than a threshold value determined in advance, it is determined that the reliability of the self-position is low.

The third index is the existence of a similar solution at matching. Specifically, when a similar solution for a solution of the self-position obtained at matching is searched by a method such as translation by the width of a parking frame and the error amount between corresponding points is substantially equal for both solutions, it is determined that the reliability of the self-position is low.

At step S627, for example, when it is determined based on all of the above-described three indexes that the reliability is high, it is determined that the self-position is correctly estimated. When it is determined based on any one or more of the indexes that the reliability is low, it is determined that the self-position is not correctly estimated. When the result of the self-position estimation is evaluated in this manner, the self-position estimation is completed and the process proceeds from step S605 to the next step S606 in FIG. 5. Not all the three indexes necessarily need to be used. The self-position diagnosis may be executed by using another index.

(Flowchart of Local Surrounding Information Selection)

Figure 7:
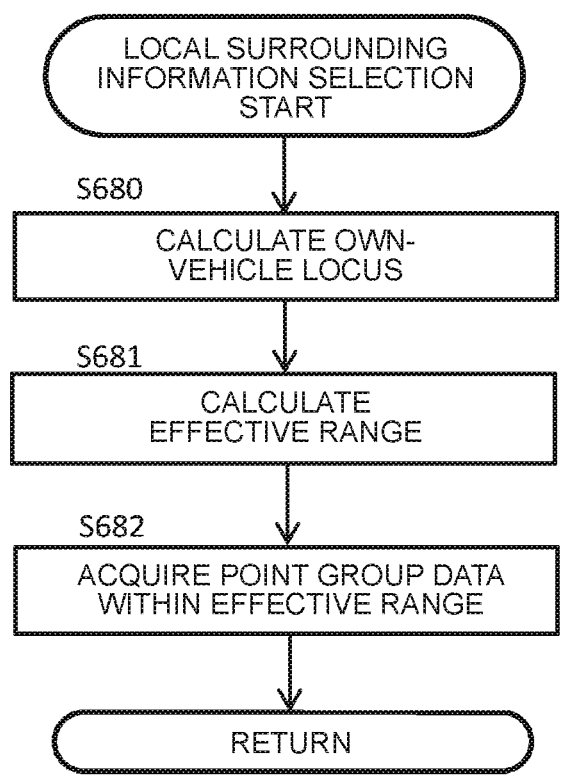
FIG. 7 is a flowchart illustrating local surrounding information selection processing.

FIG. 7 is a flowchart illustrating processing of selecting the local surrounding information 122B executed by the on-board processing apparatus 120 at step S624 in FIG. 6.

At step S680, the calculation unit 121 calculates a locus on which the vehicle 1 has traveled in the position estimation mode. In this process, the calculation unit 121 calculates the locus of the vehicle 1 so far since the start of the position estimation mode by using the result of the estimation of the movement amount of the vehicle 1, which is performed at step S622 in FIG. 6. Specifically, the locus of the vehicle 1 can be calculated by interpolating a plurality of coordinate points indicating the position of the vehicle 1 in the local coordinate system, which is calculated from the movement amount of the vehicle 1 estimated at step S622.

At step S681, the calculation unit 121 calculates the effective range of matching for each point in the local surrounding information 122B updated at step S623 in FIG. 6. In this process, the calculation unit 121 calculates, as an effective range in which matching is possible, a range in which a shape error is small as compared to the point group map 124A. The effective range may be determined based on the length and shape of the locus calculated at step S680. Specifically, an estimation error is more likely to occur to the coordinate value of each point obtained with the local surrounding information 122B as the travel distance of the vehicle 1 is longer and the rotation amount of the vehicle 1 is larger. However, it is difficult to perform matching when the number of points at which the coordinate value is obtained in the local surrounding information 122B is too small. Thus, for example, among points in a predetermined range along the locus calculated at step S680, points in a range extending backward from the current position of the vehicle 1 by a shortest distance D [m] determined in advance are acquired as points in the effective range. In a range thereafter, the amount of change in the angle of the tangent line of the locus is accumulated, and points around the locus in a range up to a position where this accumulated value changes to or beyond an angle threshold value θ [deg] determined in advance are acquired as points in the effective range. In this case, the range of X [m]×Y [m] determined in advance and centered at the locus is set as the effective range of the local surrounding information 122B. Accordingly, the effective range of the local surrounding information 122B has a shape along the obtained locus.

At step S682, the calculation unit 121 acquires each point in the effective range obtained at step S681 as a point indicating the local surrounding information 122B. Accordingly, the local surrounding information 122B is selected. Having selected the local surrounding information 122B in this manner, the calculation unit 121 proceeds from step S624 to the next step S625 in FIG. 6.

(Flowchart of Matching)

FIG. 8 is a flowchart illustrating matching processing executed by the on-board processing apparatus 120 at step S625 in FIG. 6.

At step S641, the calculation unit 121 applies the outlier list 122C stored in the RAM 122 to the local surrounding information 122B. In this process, any point listed in the outlier list 122C among a plurality of points included in the local surrounding information 122B is temporarily excluded as a processing target. The range of application of the outlier list 122C at step S641 includes steps S642 to S653 described below. Specifically, after the outlier list 122C is updated at step S654 to be described later, any point previously included in the outlier list 122C is included as a processing target. However, steps S641 to S643 cannot be executed at initial execution of the flowchart illustrated in FIG. 8, and thus execution starts at step S650. Having applied the outlier list 122C at step S641, the calculation unit 121 subsequently proceeds to step S642.

At step S642, the calculation unit 121 transforms each point in the latest local surrounding information 122B, in other words, the coordinate value of each point representing a landmark detected by landmark positioning performed at step S621 in FIG. 6 into a coordinate value in the car-park coordinate system in car park data for which it is determined at step S603 in FIG. 5 that the map formability exists. This transform is achieved by using the current position of the vehicle 1 in the local coordinate system, which is updated at step S622 in FIG. 6 and the previously calculated formula of coordinate transform from the local coordinate system to the car-park coordinate system.

At the subsequent step S643, the calculation unit 121 calculates a momentary matching degree IC of the local surrounding information 122B subjected to the coordinate transform at step S642 and the car park data used for the coordinate transform. The momentary matching degree IC is calculated by, for example, Expression (2) below.

$$IC = DIin/DIall \qquad (2)$$

In Expression (2), "DIin" represents the number of points, the distance of each of which from any point in the car park data in the point group map 124A is equal to or shorter than a threshold value determined in advance among points in the latest local surrounding information 122B subjected to the coordinate transform at step S642. In Expression (2), "DIall" represents the number of points detected through landmark positioning at step S621. Having calculated the momentary matching rate IC at step S643, the calculation unit 121 subsequently proceeds to step S644.

At step S644, the calculation unit 121 determines whether the momentary matching degree IC calculated at step S643 is higher than the predetermined threshold value. As a result, when having determined that the momentary matching degree IC is higher than the threshold value, the calculation unit 121 proceeds to step S650. When having determined that the momentary matching degree IC is equal to or lower than the threshold value, the calculation unit 121 proceeds to step S645.

At step S645, the calculation unit 121 detects a periodic characteristic, for example, a plurality of arranged parking frames from the local surrounding information 122B. Since a point group included in the point group map 124A is obtained by extracting an image edge or the like as described above, a parking frame line can be detected from points arranged at an interval corresponding to the thickness of a white line.

At the subsequent step S646, the calculation unit 121 determines whether a periodic characteristic is detected at step S645. When having determined that a periodic characteristic is detected, the calculation unit 121 proceeds to step S647. When having determined that no periodic characteristic is detected, the calculation unit 121 proceeds to step S650.

At step S647, the calculation unit 121 calculates the period of the periodic characteristic detected at step S645, for example, the width of a parking frame. The width of a parking frame is the interval between white lines included in the parking frame. The calculation unit 121 subsequently proceeds to step S647.

At step S648, the calculation unit 121 calculates the momentary matching degree IC of the local surrounding information 122B and the car park data when the coordinate transform formula calculated at the previous step S653 is changed as a reference in a plurality of manners. In this process, the coordinate transform formula is changed in a plurality of manners by using the period calculated at step S647 so that each point in the local surrounding information 122B subjected to the coordinate transform is shifted by integral multiples of the periodic characteristic detected at step S645. Then, a whole matching degree IW is calculated for each of the plurality of coordinate transform formulae after the change. The whole matching degree IW is calculated by, for example, Expression (3) below.

$$IW = DWin/DWall \qquad (3)$$

In Expression (3), "DWin" represents the number of points, the distance of each of which from any point in the car park data in the point group map 124A is equal to or shorter than a predetermined value among points in the local surrounding information 122B subjected to the coordinate transform by using the above-described coordinate transform formula. In Expression (2), "DWall" represents the number of points detected at step S621. Having calculated the whole matching degree IW at step S648, the calculation unit 121 subsequently proceeds to step S649.

At step S649, the calculation unit 121 stores, in the RAM 122, a coordinate transform formula that provides the maximum whole matching degree IW among the plurality of whole matching degrees IW calculated at step S648, and proceeds to step S650.

An iterative closest point (ICP) algorithm as a known point group matching technology may be used in association processing at step S650, error minimization processing at step S651, and convergence determination processing at step S652 described below. However, initial value setting at step S650 is unique to the present embodiment and thus will be described in detail, whereas the other processing will be only schematically described.

At step S650, which is executed when the positive determination is performed at step S644, when the negative determination is performed at step S646, when the execution of step S649 ends, or when the negative determination is performed at step S652, the calculation unit 121 associates each point included in the car park data in the point group map 124A with each point included in the local surrounding information 122B. In this process, three points are associated by using a different coordinate transform formula in accordance with processing executed beforehand. Specifically, when the process is executed following step S644 or S649, coordinate transform from the local surrounding information 122B to the car park data is performed by using a coordinate transform formula recorded in the RAM 122. Accordingly, when the positive determination is performed at step S644 and step S650 is executed, the coordinate transform formula calculated at the previously executed step S653 is used. When step S650 is executed following step S649, the coordinate transform formula stored at step S649 is used. The calculation unit 121 subsequently proceeds to step S651.

At step S651, the calculation unit 121 minimizes an error between points associated at step S650. In this process, for example, the coordinate transform formula is changed so that the sum of a distance index between each pair of points associated at step S650 is minimum. For example, the sum of the absolute value of the distance between each pair of associated points may be employed as the sum of the distance index between the points.

At the subsequent step S652, the calculation unit 121 determines whether the error has converged. As a result, when having determined that the error has converged, the calculation unit 121 proceeds to step S653. When having determined that the error has not converged, the calculation unit 121 returns to step S650 to continue the association processing and the error minimization processing.

At the subsequent step S653, the calculation unit 121 stores the coordinate transform formula lastly changed at step S651 in the RAM 122, and proceeds to step S654.

At step S654, the calculation unit 121 updates the outlier list 122C as follows. First, the existing outlier list 122C stored in the RAM 122 is cleared. Subsequently, the coordinate value of each point in the local surrounding information 122B is transformed into a coordinate value in the car-park coordinate system by using the coordinate transform formula recorded at step 653, and the distance, in other words, the Euclidean distance between each point included in the local surrounding information 122B and a point included in the point group map 124A and corresponding to the point is calculated. When the calculated distance is longer than a distance determined in advance, the point in the local surrounding information 122B is added to the outlier list 122C. In this case, the addition to the outlier list 122C may be performed by using another condition such that the point is positioned at a spatially end part. The spatially end part is a point, the distance of which to other points is long, such as a point acquired when recording is started. Through the above-described processing, the outlier list 122C is updated.

Having recorded the coordinate transform formula at error convergence and updated the outlier list 122C as described above, the calculation unit 121 ends the flowchart of FIG. 8 and proceeds from step S625 to the next step S626 in FIG. 6.

(Flowchart of Automated Parking Mode)

Figure 9:
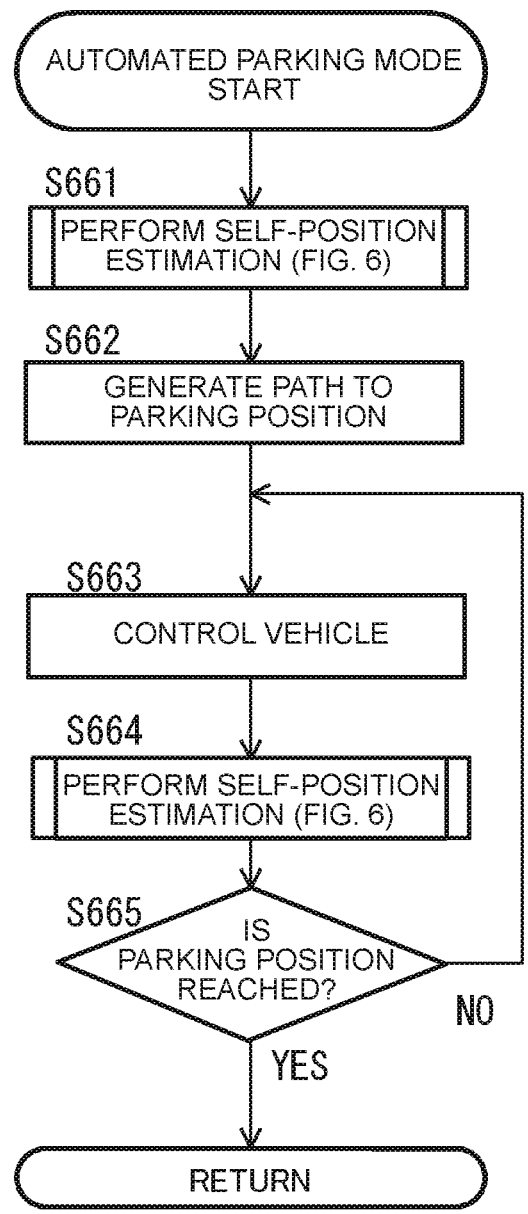
FIG. 9 is a flowchart illustrating automated parking mode processing.

FIG. 9 is a flowchart illustrating processing of the automated parking mode executed by the on-board processing apparatus 120 at step S611 in FIG. 5. The executor of each step described below is the calculation unit 121 of the on-board processing apparatus 120. When performing the processing illustrated in FIG. 9, the calculation unit 121 functions as the position estimation unit 121F and the vehicle control unit 121H.

The on-board processing apparatus 120 transitions from the position estimation mode to the automated parking mode only while the automated parking button 110B is pressed down by the user when the position estimation of the vehicle 1 is successful in the position estimation mode and the latitude and longitude, in other words, the absolute position of the vehicle 1 is in a predetermined range from a parking position. Accordingly, automated control of the vehicle 1 is performed upon approval by the user.

At step S661, the calculation unit 121 performs self-position estimation through the position estimation unit 121F to estimate the position of the vehicle 1 in the car-park coordinate system. The contents of processing at the present step are same as those of step S605 in FIG. 5, which are described above with reference to FIG. 6, and thus description thereof is omitted here.

At the subsequent step S662, the calculation unit 121 generates, by a known path generation method, a travel path from the position estimated at step S661 to a parking position stored in the point group map 124A. The calculation unit 121 subsequently proceeds to step S663.

At step S663, the calculation unit 121 controls, through the vehicle control unit 121H, the travel state of the vehicle 1 via the vehicle control apparatus 130. In this process, the on-board processing apparatus 120 controls each of the steering apparatus 131, the drive apparatus 132, and the braking apparatus 133 by outputting a predetermined vehicle control command to the vehicle control apparatus 130 based on the position of the vehicle 1 estimated at step S661, thereby moving the vehicle 1 to the parking position along the path generated at step S662. In this case, an operation command is preferably output to the drive apparatus 132 only while the automated parking button 110B is continuously pressed by the user. In addition, the braking apparatus 133 is preferably operated to stop the vehicle 1 when a person, a moving vehicle, or the like is extracted from a captured image of the camera 102A.

At the subsequent step S664, similarly to step S661, the calculation unit 121 performs self-position estimation through the position estimation unit 121F to estimate the position of the vehicle 1 in the car-park coordinate system.

At the subsequent step S665, the calculation unit 121 determines whether parking of the vehicle 1 is completed, in other words, whether the vehicle 1 has reached the parking position. As a result, when having determined that parking is not completed, the calculation unit 121 returns to step S663 to continue control of the vehicle 1. When having determined that parking is completed, the calculation unit 121 ends the flowchart of FIG. 9.

(Exemplary Operations)

Specific exemplary operations of the on-board processing apparatus 120 in the map storage mode, the position estimation mode, and the automated parking mode will be described below with reference to FIGS. 10 to 14.

(Exemplary Operation|the Map Storage Mode: 1)

FIG. 10 (a) is a plan view illustrating an exemplary car park 901. The car park 901 includes a plurality of parking areas provided in surroundings of a building 902. Each parking area is surrounded by a parking frame line such as a white line painted on a road surface. One gateway of the car park 901 is provided at a lower-left part on the drawing. The following describes exemplary operation of the on-board processing apparatus 120 in the map storage mode when the vehicle 1 is to be parked in a parking area 903 hatched in FIG. 10 (a) in the car park 901. In the exemplary operation described below, the on-board processing apparatus 120 detects a parking frame line in the car park 901 as a landmark. In the following description of the exemplary operation, the position of the vehicle 1 is represented by a triangle as illustrated in FIG. 10 (a), and an acute angle of the triangle indicates the traveling direction of the vehicle 1.

Having transitioned to the map storage mode near the entrance of the car park 901 (YES at step S501 in FIG. 4), the on-board processing apparatus 120 starts landmark positioning (steps S502 and S503) and records the coordinate values of points included in a parking frame line in the RAM 122 as the point group data 122A (steps S504 and S505). Then, the processing at steps S503 to S506 in FIG. 4 is repeated until parking of the vehicle 1 in the parking area 903 is completed.

FIG. 10 (b) is a diagram visualizing each point of a landmark represented by the point group data 122A stored in the RAM 122. In FIG. 10 (b), a solid line illustrates a point group of a landmark stored in the RAM 122, and a dashed line illustrates a landmark not stored in the RAM 122. Since the range in which sensing is possible by the external sensor group 102 of the vehicle 1 is limited, only any parking frame line near the entrance of the car park 901 is recorded in the point group data 122A when the vehicle 1 is near the entrance of the car park 901 as illustrated in FIG. 10 (b). The on-board processing apparatus 120 can record point groups of landmarks in the entire car park 901 to the point group data 122A as the user moves the vehicle 1 to the back of the car park 901 after the recording to the point group data 122A is started.

When the user has stopped the vehicle 1 in the parking area 903 and pressed the response button 110A to approve storage of the point group map 124A (YES at step S508), the on-board processing apparatus 120 acquires the latitude and longitude of the vehicle 1 from the car navigation system 107 and records the coordinate values of four corners of the parking area 903 (step S509).

When no car park data, the difference of which from the current latitude and longitude of the vehicle 1 is in a predetermined range is recorded in the point group map 124A (NO at step S510), the point group data 122A stored in the RAM 122 is recorded in the storage unit 124 as new data included in the point group map 124A, in other words, new car park data (step S515).

(Exemplary Operation|the Map Storage Mode: 2)

Subsequently, a case in which the point group data 122A illustrated in FIG. 11 (b) is newly obtained as the vehicle 1 travels in the car park 901 in a state in which data illustrated in FIG. 11 (a) is recorded as car park data in the point group map 124A will be described as exemplary operation in the map storage mode, which is different from that described above. The car park data illustrated in FIG. 11 (a) is exemplary data obtained when the vehicle 1 travels on the right side from the entrance of the car park 901 illustrated in FIG. 10 (a) to the parking area 903. In this case, since the vehicle 1 has traveled on the right side as compared to the case of FIG. 10 (a), data is not acquired for parking frame lines illustrated with dotted lines in FIG. 11 (a) nor recorded as car park data in the point group map 124A.

The point group data 122A illustrated in FIG. 11 (b) is exemplary data obtained when the vehicle 1 travels on the left side from the entrance of the car park 901 to the parking area 903. In this case, since the vehicle 1 has traveled on the left side as compared to the case of FIG. 11 (a), no point group data of parking frame lines illustrated with dotted lines in FIG. 11 (b) is acquired. In the point group data 122A illustrated in FIG. 11 (b), since the vehicle 1 does not squarely face the car park 901 when transition is made to the map storage mode, the car park 901 is recorded in an entirely tilted manner as compared to the case of FIG. 11 (a).

In such a state, when the user has stopped the vehicle 1 in the parking area 903 and pressed the response button 110A to approve storage of the point group map 124A (YES at step S508), the on-board processing apparatus 120 determines that car park data, the difference of which from the current latitude and longitude of the vehicle 1 is in the predetermined range is recorded in the point group map 124A (YES at step S510). Then, coordinate transform of the point group data 122A is performed with reference to a parking position in FIGS. 11 (a) and (b), in other words, the parking area 903 (step S511). Thereafter, the point group matching rate IB is calculated (step S512), and when it is determined that the point group matching rate IB is higher than a predetermined threshold value (YES at step S513), the point group data 122A illustrated in FIG. 11 (b) is integrated with the car park data illustrated in FIG. 11 (a) (step S514). Through the integration, data of parking frame lines on the left side in FIG. 11 (a), which is not recorded in the data of the drawing is newly recorded in the point group map 124A, and the density of points representing already recorded parking frame lines on the right side and the upper side in drawing increases in the point group map 124A.

(Exemplary Operation|Execution Phase=Position Estimation Mode+Automated Parking Mode: 1)

Subsequently, exemplary operation of an execution phase using the point group map 124A, in other words, matching processing in the position estimation mode and the automated parking mode will be described. In the exemplary operation, car park data corresponding to the entire car park 901 illustrated in FIG. 10 (a) is stored in the point group map 124A in advance.

FIG. 12 (a) is a diagram illustrating the current position of the vehicle 1 having approached the parking area 903 in the car park 901. In FIG. 12 (a), the vehicle 1 faces toward the right side in drawing.

FIG. 12 (b) is a diagram illustrating exemplary data obtained by transforming, from the local coordinate system to the car-park coordinate system, the local surrounding information 122B acquired in the position estimation mode as the vehicle 1 moves from the entrance of the car park 901 to the position illustrated in FIG. 12 (a). In the drawing, parking frame lines and the locus of the vehicle 1 indicated by the local surrounding information 122B are illustrated with dashed lines and dotted lines, respectively. The parking frame lines and the locus illustrated with dashed lines indicate points of the parking frame lines and the locus in the local surrounding information 122B out of the effective range, in other words, points listed in the outlier list 122C and excluded as a matching processing target. The parking frame lines and the locus illustrated with dotted lines indicate points of the parking frame lines and the locus in the local surrounding information 122B in the effective range.

In FIG. 12 (b), an error occurs to a result of the position estimation of the vehicle 1 because the vehicle 1 largely turns to the right, and thus deviation occurs to parking frame lines in the local surrounding information 122B before the turning, and the shape of the parking frame lines is changed from the real shape. Thus, it can be inferred that the local surrounding information 122B does not match with the point group map 124A through direct matching of the entire local surrounding information 122B. Correct matching can be performed by excluding the local surrounding information 122B before the turning and using, for matching processing, points in a predetermined range centered at an effective locus as illustrated in FIG. 12 (b).

(Exemplary Operation|Execution Phase: 2)

Subsequently, exemplary operation of matching processing in an execution phase different from that described above will be described below. In this exemplary operation as well, car park data corresponding to the entire car park 901 illustrated in FIG. 10 (a) is stored in the point group map 124A in advance.

FIG. 13 (a) is a diagram illustrating the current position of the vehicle 1 traveling toward the parking area 903 in the car park 901. In FIG. 13 (a), the vehicle 1 faces upward in the drawing.

FIG. 13 (b) is a diagram illustrating exemplary data obtained by transforming, from the local coordinate system to the car-park coordinate system, the coordinate value of each point in the local surrounding information 122B obtained through landmark positioning of parking frame lines in a front-side area of the vehicle 1, in other words, a part surrounded by a dashed line circle in FIG. 13 (a) when the vehicle 1 is at a position illustrated in FIG. 13 (a). Specifically, the data illustrated in FIG. 13 (b) is data of point groups detected from a latest captured image and processed at step S642 in FIG. 8 in the local surrounding information 122B. In FIG. 13 (b), this data is illustrated as dashed lines, not as points. FIG. 13 (b) also illustrates the position of the vehicle 1 for comparison with FIG. 13 (*a*). In the example illustrated in FIG. 13 (*b*), data of parking frame lines continuously exists on the left side of the vehicle 1, but on the right side of the vehicle 1, data of parking frame lines exists only on the front side of the vehicle 1.

FIG. 13 (*c*) is a diagram illustrating exemplary comparison between the point group map 124A and the local surrounding information 122B illustrated in FIG. 13 (*b*) when a result of estimation of the position of the vehicle 1 in the car-park coordinate system includes an error. In the example of FIG. 13 (*c*), the previous position estimation result is shifted by one parking frame width approximately, and thus deviation from the point group map 124A occurs to the local surrounding information 122B existing on the right side of the vehicle 1. In such a state, when the momentary matching degree IC is calculated at step S643 in FIG. 8, the momentary matching degree IC for the right side of the vehicle 1 is lower due to the above-described deviation. When it is determined that this value is lower than a threshold value (NO at step S644), parking frames are detected as a periodic characteristic (YES at steps S645 and S646), and the parking frame width is calculated from the point group map 124A (step S647). Then, the whole matching degree IW is calculated by shifting the local surrounding information 122B subjected to coordinate transform by integral multiples of the parking frame width (step S648).

Figure 14:
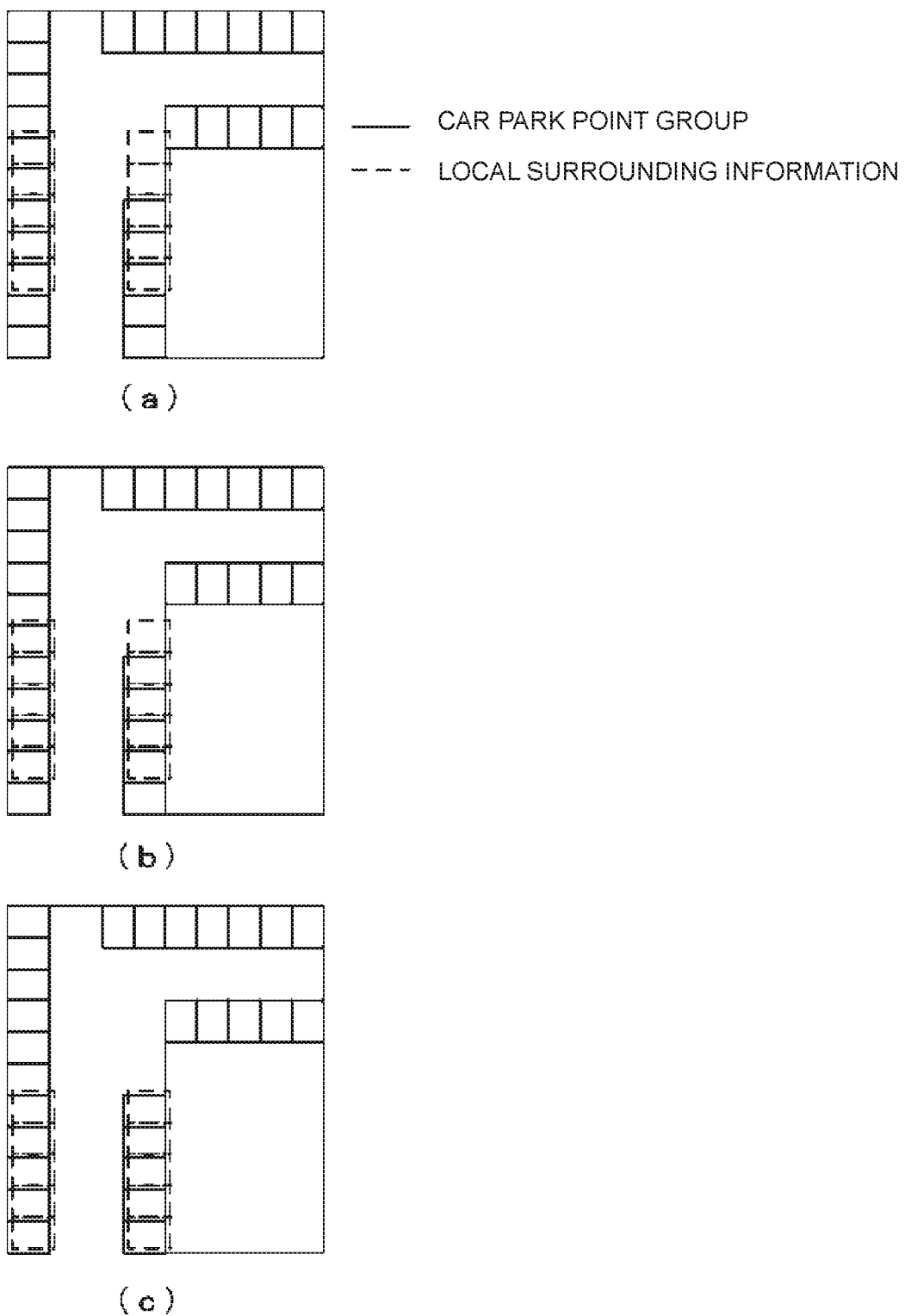
FIG. 14 is a diagram illustrating an exemplary relation between the point group map and the local surrounding information when the local surrounding information is shifted by integral multiples of a parking frame width.

FIGS. 14 (*a*), (*b*), and (*c*) are diagrams illustrating an exemplary relation between the point group map 124A and the local surrounding information 122B when the local surrounding information 122B illustrated in FIG. 13 (*c*) is shifted by integral multiples of the parking frame width. In FIGS. 14 (*a*) to (*c*), the local surrounding information 122B subjected to coordinate transform is shifted upward in the drawing by +1, 0, and −1 multiples of the parking frame width, respectively.

In FIG. 14 (*a*), the local surrounding information 122B is shifted upward in the drawing by one parking frame width, and thus the deviation between the local surrounding information 122B and the point group map 124A increases. Thus, the whole matching degree IW in FIG. 14 (*a*) is low as compared to a case without shifting. In FIG. 14 (*b*), the local surrounding information 122B is not shifted, and thus the local surrounding information 122B and the point group map 124A are shifted from each other by one parking frame width as illustrated in FIG. 13 (*c*). In FIG. 14 (*c*), the local surrounding information 122B is shifted downward in the drawing by one parking frame width, and thus the local surrounding information 122B and the point group map 124A substantially match with each other. Thus, the whole matching degree IW in FIG. 14 (*c*) is high as compared to a case without shifting of the local surrounding information 122B.

Since the whole matching degree IW increases and decreases in the above-described relation with the amount of shifting of the local surrounding information 122B, it is determined that the whole matching degree IW corresponding to the case of FIG. 14 (*c*) is maximum in the example illustrated in FIG. 14. As a result, a coordinate transform formula corresponding to the shifting amount illustrated in FIG. 14 (*c*) is stored in the RAM 122 (step S649). In this manner, the on-board processing apparatus 120 can improve the accuracy of position estimation.

According to the above-described embodiment, the following effects can be obtained.

(1) The on-board processing apparatus 120 as an information processing apparatus mounted on the vehicle 1 includes: the point group data acquisition unit 121A configured to acquire, based on information from the external sensor group 102 configured to detect an object existing in surroundings of the vehicle 1, the point group data 122A related to a plurality of points representing the object; the movement amount estimation unit 121E configured to estimate the movement amount of the vehicle 1; the storage unit 124 configured to store, as the point group map 124A recorded in association with position information including the latitude and the longitude, the relative positions of the plurality of points relative to the first reference position that is a place on the travel path of the vehicle 1; and the position estimation unit 121F configured to estimate the position of the vehicle 1 based on the point group map 124A, the point group data 122A, and the movement amount of the vehicle 1. The position estimation unit 121F generates, based on the point group data 122A and the movement amount of the vehicle 1, the local surrounding information 122B that sets the second reference position to be a place on the travel path of the vehicle 1, which is different from the place of the first reference position (step S623 in FIG. 6), and calculates, based on the point group map 124A and the local surrounding information 122B, a relational expression (coordinate transform formula) that expresses the relation between the first reference position and the second reference position (steps S649 and S651 in FIG. 8). Then, the position estimation unit 121F estimates the position of the vehicle 1 by using the calculated coordinate transform formula (step S626 in FIG. 6). In this manner, the position of the vehicle 1 can be accurately estimated based on map data.

(2) The on-board processing apparatus 120 further includes: the point group map generation unit 121C configured to generate the point group map 124A based on the point group data 122A and the movement amount of the vehicle 1 (steps S514 and S515 in FIG. 4); and the point group data verification unit 121B configured to verify the point group data 122A for the formability of the point group map 124A generated by the point group map generation unit 121C (step S507 in FIG. 4). The storage unit 124 stores the point group map 124A generated by the point group map generation unit 121C. In this manner, the on-board processing apparatus 120 can produce the point group map 124A that the on-board processing apparatus 120 itself can use in the position estimation, and thus the point group map 124A does not need to be produced in advance.

(3) The on-board processing apparatus 120 further includes a verification result presentation unit, in other words, the display control unit 121G configured to present a result of the verification of the point group data 122A by the point group data verification unit 121B to the user (step S507). In this manner, the user can be notified in advance of whether the generated point group map 124A can be used for the position estimation.

(4) The point group data verification unit 121B may verify the point group data 122A for the formability of the point group map 124A based on at least one of the state of distribution of the plurality of points in the point group data 122A, an error in the estimation of the movement amount by the movement amount estimation unit 121E, and the allowable accuracy of control of the vehicle 1. In this manner, the formability of the point group map 124A can be accurately determined in advance.

(5) The on-board processing apparatus 120 is coupled with the vehicle speed sensor 108 configured to detect the vehicle speed of the vehicle 1 and with the rudder angle sensor 109 configured to detect the steering angle of the vehicle 1. The point group data verification unit 121B may verify, based on at least one of the local formability and the autonomous navigability, whether the point group data 122A acquired at the verification interval on the travel locus of the vehicle 1 is used for the position estimation of the vehicle 1. In this case, the local formability is determined to be satisfied when the point group data 122A has a density equal to or higher than a predetermined density and has a new distribution pattern. The autonomous navigability is determined in accordance with a distance that the vehicle 1 can travel through autonomous navigation. The distance that the vehicle 1 can travel through autonomous navigation is calculated based on an error in the position estimation of the vehicle 1, which is based on an error in at least one of the vehicle speed sensor 108 and the rudder angle sensor 109, and the allowable position accuracy for control of the vehicle 1. In this manner, whether to use the point group data 122A for the position estimation of the vehicle 1 can be accurately verified.

(6) The point group data verification unit 121B may use, for the position estimation, the point group data 122A of the verification interval for which the local formability does not hold when an error in the position estimation through autonomous navigation is equal to or smaller than a predetermined error. In this manner, the amount of the point group data 122A that can be used for the position estimation can be increased to improve the accuracy of the position estimation.

(7) The on-board processing apparatus 120 further includes the display control unit 121G configured to cause the display apparatus 111 to display an image illustrating the positional relation the object and the vehicle 1 based on a result of the position estimation of the vehicle 1 by the position estimation unit 121F, (step S607 in FIG. 5). In this manner, the positional relation between the object in surroundings of the vehicle 1 and the vehicle 1, which is detected by landmark positioning can be presented to the user in an easily recognizable manner.

(8) The on-board processing apparatus 120 further includes the vehicle control unit 121H configured to move the vehicle 1 to a predetermined parking position in a car park based on the position of the vehicle 1 estimated by the position estimation unit 121F (step S663 in FIG. 9). The plurality of points in the point group map 124A each represents a constituent object in the car park, and the vehicle control unit 121H transitions to the automated parking mode (step S611) when the difference between a parking position and the position of the vehicle 1 is equal to or smaller than a predetermined value (10 m) (YES at step S608 in FIG. 5), and executes step S663 to move the vehicle 1 to the parking position. In this manner, the vehicle control unit 121H can be operated to move the vehicle 1 in a situation in which the vehicle control unit 121H can reliably move the vehicle 1 to the parking position.

(9) The vehicle control unit 121H moves the vehicle 1 to the parking position when the difference between the latitude-longitude location of the car park and the position of the vehicle 1 is smaller than a predetermined first distance (100 m) (YES at step S601 in FIG. 5) and the difference between the coordinate value of the parking position in in the point group map 124A and the position of the vehicle 1 estimated by the position estimation unit 121F is smaller than a predetermined second distance (10 m) (YES at step S608 in FIG. 5). In this manner, unnecessary vehicle control can be prevented from being performed by the vehicle control unit 121H, and the vehicle 1 can be reliably moved to the parking position.

According to the above-described embodiment, the following effects can be further obtained.

(10) The on-board processing apparatus 120 estimates a coordinate transform formula of the car-park coordinate system and the local coordinate system based on the point group map 124A and the local surrounding information 122B, and estimates the position of the vehicle 1 in the car-park coordinate system. The point group map 124A is information stored in the storage unit 124 in advance, and the local surrounding information 122B is generated based on outputs from the external sensor group 102, in other words, the camera 102A, the sonar 102B, the radar 102C, the vehicle speed sensor 108, and the rudder angle sensor 109. Specifically, the on-board processing apparatus 120 can acquire information of point groups in a coordinate system different from the coordinate system of recorded point groups and estimate the position of the vehicle 1 in the recorded coordinate system based on the correspondence relation between the different coordinate systems. Since the on-board processing apparatus 120 estimates the coordinate transform formula of the car-park coordinate system and the local coordinate system based on the point group map 124A and the local surrounding information 122B, the coordinate transform formula is unlikely to be affected by noise included in part of data of the local surrounding information 122B. Specifically, the position estimation of the vehicle 1 by the on-board processing apparatus 120 is robust over disturbance.

(11) The position estimation unit 121F searches the point group map 124A for a point corresponding to each point included in the local surrounding information 122B (step S650 in FIG. 8), and estimates the coordinate transform formula of the car-park coordinate system and the local coordinate system so that the distance between the corresponding points becomes minimum (step S651 in FIG. 8).

(12) The position estimation unit 121F performs search and estimation by excluding point data in the local surrounding information 122B of a point that corresponds to the point and the distance of which from a point included in the point group map 124A or the local surrounding information 122B is longer than a threshold value determined in advance, in other words, by applying the outlier list 122C (steps S641 and S653 in FIG. 8). Thus, data of a point at far distance, which can be regarded as a noise component is excluded as a calculation target, thereby improving the accuracy of the coordinate transform formula.

(13) Points included in the point group map 124A and the local surrounding information 122B are expressed as coordinates in a two-dimensional space. The position estimation unit 121F performs search and estimation by excluding a point, the distance of which from a corresponding point is longer than a threshold value determined in advance and that is positioned at a spatially end part in the local surrounding information 122B. A point group stored in car park data in the point group map 124A relates to a landmark closer to a parking position than a place where the map storage mode is started. Thus, when operation is started in the position estimation mode in accordance with the flowchart illustrated in FIG. 5 at a place farther from the parking position than the place where the map storage mode is started, a point not corresponding to any point stored in car park data in the point group map 124A is included in the local surrounding information 122B. An appropriate solution is not obtained when the ICP, in other words, the processing at steps S650 to S652 in FIG. 8 is performed while such as a point is included. Thus, such a point is removed to obtain an appropriate solution.

(14) The point group map 124A includes a periodic characteristic. After estimating the coordinate transform formula of the car-park coordinate system and the local coordinate system, the position estimation unit 121F corrects the coordinate transform formula of the car-park coordinate system and the local coordinate system based on the distance corresponding to one period of the periodic characteristic so that the distance between corresponding points is short (steps S646 to S648 in FIG. 8). Typically, when the point group map 124A includes a periodic characteristic, matching tends to be achieved with shift by integral multiples of the distance corresponding to the period thereof. Once matching is made with such shift, it is difficult to achieve matching to a correct position due to the property of repetitive processing. This problem is solved by shifting the coordinate transform formula by integral multiples of the period after a solution of the repetitive processing has converged. In other words, consideration is made on probability that a local solution shifted from a global solution by several periods of the periodic characteristic is reached through repetitive calculation, and the coordinate transform formula is shifted by an amount in accordance with the periodic characteristic, thereby obtaining the global solution or a local solution closer to the global solution.

(15) The position estimation unit 121F corrects the coordinate transform formula when the momentary matching degree IC as an index indicating the degree of matching between the local surrounding information 122B in the car-park coordinate system and the point group map 124A in the car-park coordinate system, which is produced based on the previously estimated position of the vehicle 1 in the car-park coordinate system, information of the latest point group data 122A acquired by the point group data acquisition unit 121A, and the latest position information of the vehicle 1 acquired by the movement amount estimation unit 121E, is lower than a threshold value determined in advance (steps S642 to S644 in FIG. 8). Thus, the processing at steps S645 to S649 in FIG. 8 can be executed only when determined to be needed based on the necessity of the processing, instead of being always executed.

(16) The on-board processing apparatus 120 includes the point group map generation unit 121C configured to produce, based on the information acquired by the point group data acquisition unit 121A and the position information of the vehicle 1 acquired by the movement amount estimation unit 121E, the point group data 122A including a plurality of coordinate values of points representing part of an object except for a moving object in a third coordinate system (the recording coordinate system) and store the point group data 122A in the storage unit 124 as the point group map 124A. Thus, the on-board processing apparatus 120 can produce the point group map 124A when the vehicle 1 on which the on-board processing apparatus 120 is mounted travels. The processing of producing the point group map 124A and the processing of position estimation of the vehicle 1 are common in landmark positioning and can use a common program module.

(17) The third coordinate system (recording coordinate system) is set based on the position and posture of the vehicle 1 when production of the point group data 122A is started. When a plurality of pieces of the point group data 122A of different coordinate systems are obtained due to difference in the position or posture of the vehicle when production of the point group data 122A is started, the point group map generation unit 121C estimates the relation among the different coordinate systems with reference to the parking position of the vehicle 1 and integrates the plurality of pieces of the point group data 122A (steps S511 and S514 in FIG. 4). Thus, even when a different recording coordinate system is set at each acquisition of the point group data 122A, the plurality of pieces of the point group data 122A can be integrated. This is based on a fact that the position and posture of the vehicle 1 when acquisition of the point group data 122A is started are different but the vehicle 1 is parked at the same parking position.

(18) The on-board processing apparatus 120 includes the vehicle control apparatus 130 configured to drive the vehicle 1 based on an output from the position estimation unit 121F and move the vehicle 1 to a parking position specified in advance in the car-park coordinate system, and the absolute position acquisition unit 121D configured to acquire the latitude and longitude of the vehicle 1 from the car navigation system 107 configured to receive information (latitude and longitude) related to the position of the vehicle 1. A point included in the point group map 124A is a point indicating part of a constituent object in the car park. The storage unit 124 also stores the latitude and longitude of the car park as the point group map 124A. The on-board processing apparatus 120 includes the vehicle control unit 121H configured to move the vehicle 1 to a parking position by using the vehicle control apparatus 130. Thus, the on-board processing apparatus 120 can perform automated parking of the vehicle 1 to a parking position included in the point group map 124A.

(19) The on-board processing apparatus 120 includes the car navigation system 107, and the external sensor group 102 configured to sense a point group in surroundings of the vehicle 1, in other words, the sensor camera 102A, the sonar 102B, and the radar 102C, and generates, through the point group map generation unit 121C, the point group map 124A in a data format as illustrated in FIG. 2 in which the point group and the latitude-longitude information are associated with each other. The existence of a point group in surroundings and the relation with a road map can be determined by referring to the latitude-longitude information, and transition can be automatically made to the map storage mode and the position estimation mode. Thus, the user does not need to perform an operation for mode transition, and transition can be smoothly made to map storage and automated parking during travel of the vehicle 1.

The above-described embodiment may be modified as described below.

(1) When causing the display apparatus 111 to display an image illustrating a self-position estimation result at step S607 in FIG. 5, the display control unit 121G may change the display form of the image in accordance with the formability of the point group map 124A. Specifically, when the point group data 122A acquired in the map storage mode is recorded in the point group map 124A, information indicating the existence of the map formability is recorded for each part of the point group map 124A, in other words, each point in car park data included in the point group map 124A as described above. The map formability of a map image or a panoramic image to be displayed on the display apparatus 111 at step S607 is determined for each part based on the information, and the image is displayed in a different display form of color, brightness, line thickness, and the like between a part for which the map formability is high and a part for which the map formability is low. In this manner, the reliability of a self-position estimation result displayed on the display apparatus 111 can be presented to the user in an easily recognizable manner.

(2) When controlling the vehicle 1 to move at step S663 in FIG. 9, the vehicle control unit 121H may restrict the movement range of the vehicle 1 in accordance with the formability of the point group map 124A. Specifically, when the point group data 122A acquired in the map storage mode is recorded in the point group map 124A, information indicating the existence of the map formability is recorded for each part of the point group map 124A, in other words, each point in car park data included in the point group map 124A as described above. The map formability in a map range in which the vehicle 1 is to be move at step S663 is determined based on the information to prevent the vehicle 1 from entering an area in which the map formability is low. In this manner, during movement of the vehicle 1, it is possible to prevent the vehicle 1 from wrongly colliding an obstacle such as a wall due to an error in the point group map 124A.

(3) The on-board processing apparatus 120 may delete the determination condition at step S608 in FIG. 5 and move the vehicle 1 to a parking position by using the vehicle control apparatus 130 when self-position estimation is completed in the position estimation mode and the automated parking button 110B is pressed by the user. Specifically, the vehicle 1 may be moved to a parking position by using the vehicle control apparatus 130 when the distance between the position of the vehicle 1 and the position of a car park, which is measured by the car navigation system 107 is shorter than a distance (100 m) determined in advance. In this manner, automated parking of the vehicle 1 to a parking position included in the point group map 124A can be started at a far position where the parking position cannot be directly observed by any sensor mounted on the vehicle 1.

(4) The on-board processing apparatus 120 may be coupled with a plurality of cameras. The on-board processing apparatus 120 can extract, by using captured images of the plurality of cameras, the point group data 122A from landmarks existing in a wide range in surroundings of the vehicle 1.

(5) The on-board processing apparatus 120 does not necessarily need to receive sensing results from the vehicle speed sensor 108 and the rudder angle sensor 109. In this case, the on-board processing apparatus 120 estimates the movement amount of the vehicle 1 by using, for example, a captured image of the camera 102A. Specifically, the on-board processing apparatus 120 calculates the positional relation between an object in the captured image and the camera 102A by using internal and external parameters stored in the ROM 123. It is possible to estimate the movement amount and movement direction of the vehicle 1 by tracing the object across a plurality of captured images.

(6) Point group information such as the point group map 124A, the point group data 122A, and the local surrounding information 122B may be stored in the storage unit 124 and the RAM 122 as three-dimensional information. In this case, three-dimensional point group information may be projected onto a two-dimensional plane and two-dimensionally compared with another point group as in the embodiment or may be compared with a three-dimensional point group. For example, the on-board processing apparatus 120 can obtain a three-dimensional point group of a landmark as described below. Specifically, a three-dimensional point group of a stationary stereoscopic object can be obtained by using a well-known motion stereo technology and information obtained by correcting a motion estimation part through an internal sensor or a positioning sensor by using the movement amount of the vehicle 1 calculated based on outputs from the vehicle speed sensor 108 and the rudder angle sensor 109, and a plurality of captured images output from the camera 102A.

(7) The on-board processing apparatus 120 may proceed to step S645 when the negative determination is continuously performed a plurality of times at step S644 in FIG. 8 instead of proceeding to step S645 upon one negative determination.

(8) In place of the determination at step S644 in FIG. 8, the on-board processing apparatus 120 may determine whether the fraction of points determined to be out of an application range (outlier) in the local surrounding information 122B is larger than a threshold value determined in advance. In this case, when the fraction is larger than the threshold value, the on-board processing apparatus 120 proceeds to step S645. When the fraction is equal to or smaller than the threshold value, the on-board processing apparatus 120 proceeds to step S650. The on-board processing apparatus 120 may proceed to step S645 only when the above-described fraction is large in addition to the determination at step S644 in FIG. 8.

(9) The on-board processing apparatus 120 may perform the processing at steps S645 and S647 in FIG. 8 beforehand. In addition, the on-board processing apparatus 120 may record a result of the processing in the storage unit 124.

(10) The on-board processing apparatus 120 may receive an operation command from the user not only from the input apparatus 110 provided inside the vehicle 1 but also from the communication apparatus 114. For example, communication may be performed between a portable terminal owned by the user and the communication apparatus 114, and as the user operates the portable terminal, the on-board processing apparatus 120 may perform operation similar to that in a case in which the automated parking button 110B is pressed. In this case, the on-board processing apparatus 120 may perform automated parking not only when the user is inside the vehicle 1 but also after the user leaves the vehicle 1.

(11) The on-board processing apparatus 120 may perform parking not only at a parking position recorded in the point group map 124A but also at a position specified by the user. Parking position specification by the user is performed, for example, when the user selects, through the input apparatus 110, one of parking position candidates displayed on the display apparatus 111 by the on-board processing apparatus 120.

(12) The on-board processing apparatus 120 may receive a point group map 124A from the outside through the communication apparatus 114 and may transmit a produced point group map 124A to the outside through the communication apparatus 114. In this case, the on-board processing apparatus 120 may communicate the point group map 124A with another on-board processing apparatus 120 mounted on another vehicle or with an apparatus managed by an organization that manages a car park.

(13) The automated parking system 100 may include a portable terminal in place of the car navigation system 107 and record the identification information of a base station communicating with the portable terminal in place of the latitude and the longitude. This is because the base station has a limited communication range of several hundred meters approximately and thus a car park is highly likely to be identical when the communicating base station is identical.

(14) A periodic characteristic included in the car park data in the point group map 124A is not limited to parking frames. For example, the periodic characteristic may be a plurality of straight lines included in a pedestrian crosswalk as a road surface paint. Alternatively, the periodic characteristic may be regularly arranged columns when car park data includes information of an obstacle such as a wall, which is acquired by a laser radar or the like.

(15) Vehicles and persons as moving objects are not included in landmarks in the above-described embodiment, but moving objects may be included in landmarks. In this case, a landmark as a moving object and a landmark as a non-moving object may be stored in an identifiable manner.

(16) In the map storage mode, the on-board processing apparatus 120 may identify a landmark detected by landmark positioning and record an identification result of each landmark in addition to the point group map 124A. A landmark is identified by using, for example, shape information and color information of the landmark obtained from a captured image as well as stereoscopic shape information of the landmark obtained by a well-known motion stereo technology. The landmark is identified as, for example, a parking frame, a road surface paint other than a parking frame, a curb, a guardrail, or a wall. In addition, the on-board processing apparatus 120 may include, in landmarks, a vehicle and a person as moving objects and record identification results thereof in addition to the point group map 124A, similarly to other landmarks. In this case, the vehicle and the person may be collectively identified and recorded as a "moving object" or may be individually identified and recorded.

The above-described embodiment and various modifications are merely exemplary. The present invention is not limited to the above-described embodiment as long as characteristics of the present invention are not lost, and any other form that would be thought within the range of technical idea of the present invention is included in the range of the present invention.

The entire contents of the following priority claim application are incorporated herein by reference.

Japanese Patent application No. 2018-104102 (filed on May 30, 2018)

REFERENCE SIGNS LIST

1 . . . vehicle
100 . . . automated parking system
102 . . . external sensor group
102A . . . camera
102B . . . sonar
102C . . . radar
107 . . . car navigation system
108 . . . vehicle speed sensor
109 . . . rudder angle sensor
110 . . . input apparatus
110A . . . response button
110B . . . automated parking button
111 . . . display apparatus
114 . . . communication apparatus
120 . . . on-board processing apparatus
121 . . . calculation unit
121A . . . point group data acquisition unit
121B . . . point group data verification unit
121C . . . point group map generation unit
121D . . . absolute position acquisition unit
121E . . . movement amount estimation unit
121F . . . position estimation unit
121G . . . display control unit
121H . . . vehicle control unit
121I . . . mode switching unit
122 . . . RAM
122A . . . point group data
122B . . . local surrounding information
122C . . . outlier list
123 . . . ROM
124 . . . storage unit
124A . . . point group map
125 . . . interface
130 . . . vehicle control apparatus
IB . . . point group matching rate
IC . . . momentary matching degree
IW . . . whole matching degree

The invention claimed is:

1. An information processing apparatus mounted on a vehicle and coupled with a vehicle speed sensor configured to detect a vehicle speed of the vehicle and with a rudder angle sensor configured to detect a steering angle of the vehicle, the information processing apparatus comprising:

a point group data acquisition unit configured to acquire, based on information from a sensor configured to detect an object existing in surroundings of the vehicle, point group data related to a plurality of points representing the object;

a movement amount estimation unit configured to estimate a movement amount of the vehicle;

a storage unit configured to store, as a point group map recorded in association with position information including a latitude and a longitude, relative positions of the plurality of points relative to a first reference position that is a place on a travel path of the vehicle;

a position estimation unit configured to estimate a position of the vehicle based on the point group map, the point group data, and the movement amount;

a point group map generation unit configured to generate the point group map based on the point group data and the movement amount; and a point group data verification unit configured to verify the point group data for formability of the point group map generated by the point group map generation unit, wherein the position estimation unit:

generates, based on the point group data and the movement amount, local surrounding information that sets a second reference position to be a place on the travel path of the vehicle, which is different from the place of the first reference position, calculates, based on the point group map and the local surrounding information, a relational expression that expresses a relation between the first reference position and the second reference position, and estimates the position of the vehicle by using the relational expression, wherein the storage unit stores the point group map generated by the point group map generation unit, wherein the point group data verification unit verifies, based on at least one of local formability and autonomous navigability, whether the point group data acquired at a verification interval on a travel locus of the vehicle is to be used in the position estimation of the vehicle, wherein the local formability is determined to be satisfied when the point group data has a density equal to or higher than a predetermined density and there is no distribution pattern identical to a distribution pattern of the point group data, wherein the autonomous navigability is determined in accordance with a distance that the vehicle can travel through autonomous navigation, and wherein the distance that the vehicle can travel through autonomous navigation is calculated based on an error in the estimation of the position of the vehicle, which is based on an error in at least one of the vehicle speed sensor and the rudder angle sensor, and an allowable accuracy of position for control of the vehicle.

2. The information processing apparatus according to claim 1, further comprising a vehicle control unit configured to move the vehicle based on the position of the vehicle estimated by the position estimation unit, wherein
the storage unit further stores, for each part of the point group map, formability information related to formability of the point group map, and
the vehicle control unit restricts a movement range of the vehicle based on the formability information.

3. The information processing apparatus according to claim 1, further comprising a verification result presentation unit configured to present a result of the verification of the point group data by the point group data verification unit to a user.

4. The information processing apparatus according to claim 1, wherein the point group data verification unit verifies the point group data for the formability of the point group map based on at least one of a state of distribution of the plurality of points in the point group data, an error in the estimation of the movement amount by the movement amount estimation unit, and an allowable accuracy of control of the vehicle.

5. The information processing apparatus according to claim 1, further comprising a vehicle control unit configured to move the vehicle to a predetermined parking position in a car park based on the position of the vehicle estimated by the position estimation unit, wherein
the plurality of points in the point group map each represent a constituent object of the car park, and
the vehicle control unit moves the vehicle to the parking position when a difference between the parking position and the position of the vehicle is equal to or smaller than a predetermined value.

6. The information processing apparatus according to claim 5, wherein the vehicle control unit moves the vehicle to the parking position when a difference between a latitude-longitude location of the car park and the position of the vehicle is smaller than a predetermined first distance and a difference between the parking position in the point group map and the position of the vehicle estimated by the position estimation unit is smaller than a predetermined second distance.

7. The information processing apparatus according to claim 1, further comprising a display control unit configured to cause a display apparatus to display an image illustrating a positional relation between the object and the vehicle based on a result of the position estimation of the vehicle by the position estimation unit.

8. The information processing apparatus according to claim 7, wherein the storage unit further stores, for each part of the point group map, formability information related to formability of the point group map, and
the display control unit changes a display form of the image in accordance with the formability of the point group map based on the formability information.

9. An information processing apparatus mounted on a vehicle, the information processing apparatus comprising:
a point group data acquisition unit configured to acquire, based on information from a sensor configured to detect an object existing in surroundings of the vehicle, point group data related to a plurality of points representing the object;
a movement amount estimation unit configured to estimate a movement amount of the vehicle;
a storage unit configured to store, as a point group map recorded in association with position information including a latitude and a longitude, relative positions of the plurality of points relative to a first reference position that is a place on a travel path of the vehicle;
a position estimation unit configured to estimate a position of the vehicle based on the point group map, the point group data, and the movement amount,
wherein the position estimation unit:
generates, based on the point group data and the movement amount, local surrounding information that sets a second reference position to be a place on the travel path of the vehicle, which is different from the place of the first reference position,
calculates, based on the point group map and the local surrounding information, a relational expression that expresses a relation between the first reference position and the second reference position, and
estimates the position of the vehicle by using the relational expression;
a point group map generation unit configured to generate the point group map based on the point group data and the movement amount; and
a point group data verification unit configured to verify the point group data for formability of the point group map generated by the point group map generation unit,
wherein the storage unit stores the point group map generated by the point group map generation unit;
wherein:
the information processing apparatus is coupled with a vehicle speed sensor configured to detect a vehicle speed of the vehicle and with a rudder angle sensor configured to detect a steering angle of the vehicle,
the point group data verification unit verifies, based on at least one of local formability and autonomous navigability, whether the point group data acquired at a verification interval on a travel locus of the vehicle is to be used in the position estimation of the vehicle,
the local formability is determined to be satisfied when the point group data has a density equal to or higher than a predetermined density and has a new distribution pattern,
the autonomous navigability is determined in accordance with a distance that the vehicle can travel through autonomous navigation, and
the distance that the vehicle can travel through autonomous navigation is calculated based on an error in the estimation of the position of the vehicle, which is based on an error in at least one of the vehicle speed sensor and the rudder angle sensor, and an allowable accuracy of position for control of the vehicle;
wherein the point group data verification unit uses, for the position estimation, the point group data of the verification interval for which the local formability does not hold when an error in the position estimation through the autonomous navigation is equal to or smaller than a predetermined error.

* * * * *